United States Patent
Takahashi et al.

(10) Patent No.: US 9,624,848 B2
(45) Date of Patent: Apr. 18, 2017

(54) CONTROL DEVICE THAT CAN SUPPRESS FLUCTUATION OF TORQUE TRANSMITTED TO THE WHEELS

(71) Applicant: AISIN AW CO., LTD., Anjo-shi, Aichi-ken (JP)

(72) Inventors: Yusuke Takahashi, Anjo (JP); Kohei Tsuda, Nishio (JP); Masashi Kito, Anjo (JP); Yuichi Seki, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 338 days.

(21) Appl. No.: 14/379,916

(22) PCT Filed: Mar. 6, 2013

(86) PCT No.: PCT/JP2013/056171
§ 371 (c)(1),
(2) Date: Aug. 20, 2014

(87) PCT Pub. No.: WO2013/146150
PCT Pub. Date: Oct. 3, 2013

(65) Prior Publication Data
US 2015/0006063 A1    Jan. 1, 2015

(30) Foreign Application Priority Data

Mar. 30, 2012  (JP) ................................ 2012-079731

(51) Int. Cl.
*B60K 6/48*        (2007.10)
*F02D 31/00*       (2006.01)
(Continued)

(52) U.S. Cl.
CPC .............. *F02D 31/001* (2013.01); *B60K 6/48* (2013.01); *B60K 6/547* (2013.01); *B60L 11/14* (2013.01);
(Continued)

(58) Field of Classification Search
CPC ........ B60L 3/12; B60L 2240/12; B60L 11/12; B60L 15/2063; B60K 6/48; F02D 31/001
See application file for complete search history.

(56) References Cited

U.S. PATENT DOCUMENTS 8,738,209 B2 *  5/2014  Oba ...................... B60K 6/445
                                               180/65.25
2011/0021312 A1   1/2011  Fukitani
2012/0309587 A1  12/2012  Nozaki

FOREIGN PATENT DOCUMENTS

JP    A-2008-273460    11/2008
JP    A-2010-143307     7/2010
(Continued)

*Primary Examiner* — John Walters
*Assistant Examiner* — James Triggs
(74) *Attorney, Agent, or Firm* — Oliff PLC

(57) ABSTRACT

A control device that controls a vehicle drive device in which a first engagement device, a rotary electric machine, and a second engagement device are arranged in this order from an internal combustion engine on a power transmission path that connects the internal combustion engine to wheels. The control device is configured to determine an operation stop of the internal combustion engine in a state in which torque is transmitted from the internal combustion engine to the wheels, the control device executes rotational speed control that controls output torque of the rotary electric machine such that a rotational speed of the rotary electric machine approaches a target rotational speed and executes torque-down control that causes output torque of the internal combustion engine to decrease.

13 Claims, 10 Drawing Sheets

(51) Int. Cl.
  *B60L 11/14* (2006.01)
  *B60L 15/20* (2006.01)
  *B60W 10/02* (2006.01)
  *B60W 10/06* (2006.01)
  *B60W 10/08* (2006.01)
  *B60W 20/40* (2016.01)
  *B60K 6/547* (2007.10)
  *B60W 10/04* (2006.01)
  *B60W 20/00* (2016.01)
  *F02D 29/02* (2006.01)

(52) U.S. Cl.
  CPC ............. *B60L 15/20* (2013.01); *B60W 10/02* (2013.01); *B60W 10/04* (2013.01); *B60W 10/06* (2013.01); *B60W 10/08* (2013.01); *B60W 20/00* (2013.01); *B60W 20/40* (2013.01); *F02D 29/02* (2013.01); *B60K 2006/4825* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2270/145* (2013.01); *B60W 2710/081* (2013.01); *F02D 2700/07* (2013.01); *Y02T 10/6221* (2013.01); *Y02T 10/6252* (2013.01); *Y02T 10/6286* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(56) References Cited

FOREIGN PATENT DOCUMENTS

| JP | A-2010-149539 | 7/2010 |
| JP | A-2010-195363 | 9/2010 |
| JP | A-2011-25811 | 2/2011 |
| JP | A-2012-245913 | 12/2012 |

\* cited by examiner

CONTROL DEVICE THAT CAN SUPPRESS FLUCTUATION OF TORQUE TRANSMITTED TO THE WHEELS

TECHNICAL FIELD

The present invention relates to a control device that controls a vehicle drive device in which a first engagement device, a rotary electric machine, and a second engagement device are arranged in this order from an internal combustion engine on a power transmission path that connects the internal combustion engine to wheels.

BACKGROUND ART

A technology described in Patent Document 1 is already known as an example of the control device described above. The technology described in Patent Document 1 discloses transition control that causes transition from a parallel mode using at least an internal combustion engine as a driving force source to an electric power mode using only a rotary electric machine as a driving force source. In the technology in Patent Document 1, the control device is configured to, after the transition from the parallel mode to the electric power mode is determined in a state in which a first engagement device is in a direct engaged state, when a rotational speed of the internal combustion engine decreases down to a predetermined rotational speed or less, start disengagement control for the first engagement device and start zero-torque control that causes output torque of the internal combustion engine to be zero, and after the first engagement device is disengaged, suspend combustion of the internal combustion engine.

The technology in Patent Document 1 is based on the assumption that a vehicle speed decreases after the transition from the parallel mode to the electric power mode is determined, that is, a case is supposed in which the transition from the parallel mode to the electric power mode is determined, for example, because of a decrease in an extent of opening of an accelerator.

RELATED ART DOCUMENT

Patent Document

Patent Document 1: Japanese Patent Application Publication No. 2010-149539 (JP 2010-149539 A)

SUMMARY OF THE INVENTION

Problem to be Solved by the Invention

However, the determination of the transition from the parallel mode to the electric mode may not be related with an operation of the accelerator, for example, the transition may be determined in a case in which an amount of electric power stored in a battery becomes greater than or equal to a limit amount of electric power, in a case in which warm-up of the internal combustion engine has completed, and the like. The technology in Patent Document 1 does not consider these cases.

For example, in the technology in Patent Document 1; the amount of electric power stored in the battery becomes greater than or equal to a limit amount of electric power when the first engagement device is in the direct engaged state; the transition from the parallel mode to the electric power mode is determined; and thereafter, in a case which the zero-torque control that causes the output torque of the internal combustion engine to be zero is started, in order to maintain a driving force of the vehicle, it is necessary to cause output torque of the rotary electric machine to increase. However, in a case in which the timing of a decrease in the output torque of the internal combustion engine due to a start of the zero-torque control does not accord with the timing of an increase in the output torque of the rotary electric machine, the torque transmitted to the wheels is fluctuated, which may give an uncomfortable feeling to a driver.

Therefore, at the transition from the parallel mode to the electric power mode, the control devices are required, which are capable of suppressing the fluctuation of the torque transmitted to the wheels as well as increasing the output torque of the rotary electric machine in accordance with a decrease in the output torque of the internal combustion engine.

Means for Solving the Problem

A control device according to the present invention that controls a vehicle drive device in which a first engagement device, a rotary electric machine, and a second engagement device are arranged in this order from an internal combustion engine on a power transmission path that connects the internal combustion engine to wheels, is characterized in that, in a case in which the control device determines an operation stop of the internal combustion engine in a state in which torque is transmitted from the internal combustion engine to the wheels, the control device controls the second engagement device so as to be in a slip engaged state, executes rotational speed control that controls output torque of the rotary electric machine such that a rotational speed of the rotary electric machine approaches a target rotational speed, and executes torque-down control that causes output torque of the internal combustion engine to decrease.

The term "rotary electric machine" in the present application refers to any of a motor (electric motor), a generator (electric generator), and a motor generator that functions both as a motor and as a generator as necessary.

According to the aforementioned characterized configuration, in a case in which an operation stop of the internal combustion engine is determined in a state in which torque is transmitted from the internal combustion engine to the wheels, the torque-down control for the internal combustion engine is executed. Therefore, in order to maintain the driving force of the vehicle, it is necessary to cause the output torque of the rotary electric machine to increase in accordance with a decrease in the output torque of the internal combustion engine.

When the output torque of the internal combustion engine is caused to decrease due to the torque-down control, the torque that is transmitted from the internal combustion engine side to the rotary electric machine decreases in accordance with the decrease in the output torque of the internal combustion engine and the rotational speed of the rotary electric machine tries to lower. Against such effect, in order to maintain the rotational speed of the rotary electric machine at the target rotational speed, the output torque of the rotary electric machine is caused to increase along with the decrease in the output torque of the internal combustion engine. Therefore, it is possible to cause the output torque of the rotary electric machine to increase in accordance with the decrease in the output torque of the internal combustion engine and also to suppress that the torque transmitted to the wheels side fluctuates.

Here, it is preferable that, in a case in which the control device determines an operation stop of the internal combustion engine, the control device controls the second engagement device so as to be in a slip engaged state.

According to such a configuration, the second engagement device is controlled so as to be in the slip engaged state. Therefore, it is possible to suppress torque fluctuation being transmitted to the wheels side even if the torque fluctuation is generated when causing the output torque of the internal combustion engine to decrease and the output torque of the rotary electric machine to increase.

Here, it is preferable that, in the torque-down control, the control device causes the output torque of the internal combustion engine to gradually decrease and causes an engagement pressure of the first engagement device to decrease in accordance with the decrease in the output torque of the internal combustion engine due to the torque-down control.

According to such a configuration, the output torque of the internal combustion engine is caused to "gradually" decrease. Therefore, it is possible to cause the output torque of the rotary electric machine to increase while suppressing follow-up delay with respect to the decrease in the output torque of the internal combustion engine being generated. In addition, the engagement pressure of the first engagement device is caused to decrease in accordance with the decrease in the output torque of the internal combustion engine. Therefore, it is possible to cause the first engagement device to transition to the disengaged state while causing the output torque of the internal combustion engine to gradually decrease and causing the output torque of the rotary electric machine to gradually increase. In addition, the engagement pressure of the first engagement device is caused to decrease in accordance with the decrease in the output torque of the internal combustion engine. Therefore, it is possible to make the torque transmitted from the internal combustion engine side to the rotary electric machine through the first engagement device to concede with the decrease in the output torque of the internal combustion engine. Thereby, it is possible to cause the output torque of the rotary electric machine to smoothly increase even when the engagement pressure of the first engagement device is caused to decrease.

Here, it is preferable that, during the execution of the torque-down control, the control device controls the engagement pressure of the first engagement device such that a rotational speed of the internal combustion engine approaches a target rotational speed.

Along with the decrease in the output torque of the internal combustion engine due to the torque-down control, the rotational speed of the internal combustion engine tries to lower. Against such effect, according to the aforementioned configuration, in order to maintain the rotational speed of the internal combustion engine at the target rotational speed, the engagement pressure of the first engagement device is caused to decrease, and the torque transmitted from the internal combustion engine side to the rotary electric machine side though the first engagement device that is in the slip engaged state decreases. Thereby, the feedback control is capable of causing the engagement pressure of the first engagement device to decrease in accordance with the decrease in the output torque of the internal combustion engine.

Here, it is preferable that, after the control device determines that the first engagement device has been brought into a disengaged state due to a decrease in the engagement pressure of the first engagement device, the control device causes the second engagement device to transition from the slip engaged state to a direct engaged state.

According to such a configuration, the second engagement device is controlled so as to be in the slip engaged state until it is determined that the first engagement device has been brought into the disengaged state. Therefore, it is possible to suppress torque fluctuation that is generated when bringing the first engagement device into the disengaged state being transmitted to the wheels side. In addition, because the first engagement device is in the disengaged state, it is possible to suppress the torque fluctuation accompanied by a stop of the internal combustion engine being transmitted to the wheels side even when the second engagement device is caused to transition to the direct engaged state.

Here, it is preferable that, after the control device determines that the first engagement device has been brought into a disengaged state due to a decrease in the engagement pressure of the first engagement device, the control device stops combustion of the internal combustion engine.

According to such a configuration, it is possible to naturally lower the rotational speed of the internal combustion engine with inertia in a state in which the first engagement device is in the disengaged state.

Here, it is preferable that, the control device estimates drag torque that is transmission torque transmitted through the first engagement device in a state in which a request value of the engagement pressure of the first engagement device is zero, and after the engagement pressure of the first engagement device starts to decrease, in a case in which the output torque of the rotary electric machine achieves a determination torque, the control device determines that the first engagement device has been brought into the disengaged state, the determination torque being set in accordance with torque acquired by subtracting the drag torque from transmission torque that is transmitted from the rotary electric machine to the wheels side through the second engagement device that is controlled so as to be in the slip engaged state.

In a case in which drag torque is generated in the first engagement device, even when the request value of the engagement pressure of the first engagement device is decreased down to zero, the actual transmission torque of the first engagement device does not decrease down to zero, but decreases down to the drag torque. Therefore, the output torque of the rotary electric machine increases up to torque that is by the drag torque lower than the transmission torque that is transmitted from the rotary electric machine to the wheels side through the second engagement device that is controlled so as to be in the slip engaged state. According to the aforementioned configuration, in a case in which the output torque of the rotary electric machine achieves the determination torque being set in accordance with torque acquired by subtracting the drag torque from the transmission torque that is transmitted through the second engagement device, it is determined that the first engagement device has been brought into the disengaged state. Therefore, even when drag torque is generated, it is possible to accurately determine the disengaged state of the first engagement device.

Here, it is preferable that the control device estimates the drag torque based on a rotational speed difference between engagement members of the first engagement device.

According to such a configuration, even when the engagement state of the first engagement device when an operation stop of the internal combustion engine is determined differs, that is, the direct engaged state or the slip engaged state, and the rotational speed difference of the first engagement device when causing the first engagement device to transition to the disengaged state varies, it is possible to accurately estimate the drag torque. Therefore, it is possible to accurately determine the disengaged state of the first engagement device.

Here, it is preferable that, after the control device determines that the first engagement device has been brought into a disengaged state, the control device stops combustion of the internal combustion engine, and thereafter, causes the second engagement device to transition from the slip engaged state to a direct engaged state.

According to such a configuration, even when the combustion of the internal combustion engine is caused to stop before the first engagement device is brought into the disengaged state, for example, because of occurrence of an error in the determination of the disengaged state in the first engagement device, and torque fluctuation accompanied by the combustion stop is transmitted to the rotary electric machine side, it is possible to suppress the torque fluctuation transmitted to the rotary electric machine side being transmitted to the wheels side because the second engagement device is controlled so as to be in the slip engaged state until the combustion of the internal combustion engine stops.

Here, it is preferable that the control device stops the combustion of the internal combustion engine, the rotational speed of the internal combustion engine achieves a determination rotational speed, and thereafter, the control device causes the second engagement device to transition from the slip engaged state to the direct engaged state, the determination rotational speed being set in accordance with a synchronous rotational speed that is a rotational speed of the rotary electric machine in a case in which the second engagement device is in the direct engaged state.

According to such a configuration, the determination rotational speed that is compared with the rotational speed of the internal combustion engine is set in accordance with the synchronous rotational speed. Therefore, at the time of transition of the second engagement device to the direct engaged state, it is possible to cause the rotational speed of the internal combustion engine to approach the synchronous rotational speed, thereby it is possible to cause the rotational speed difference of the first engagement device to approach to zero. Because the rotational speed difference of the first engagement device is close to zero, it is possible to cause the drag torque to approach to zero. Thus, when the second engagement device transitions to the direct engaged state, it is possible to suppress the drag torque being transmitted to the wheels thereby causing a torque shock.

Here, it is preferable that, after the second engagement device is brought into the direct engaged state, the control device terminates the rotational speed control for the rotary electric machine and starts torque control for the rotary electric machine.

According to such a configuration, after the second engagement device is brought into the direct engaged state, it is possible to terminate the rotational speed control for the rotary electric machine and resume regular torque control. Therefore, after the second engagement device is brought into the direct engaged state, it is possible to transmit necessary torque to the wheels.

In the present application, the expression "drivingly coupled" refers to a state in which two rotating elements are coupled together such that a driving force can be transmitted between the two rotating elements, and is used as a concept including a state in which the two rotating elements are coupled together so as to rotate together, or a state in which the two rotating elements are coupled together such that the driving force can be transmitted between the two rotating elements via one or more transmission members. Such transmission members include various kind of members that transmit rotation at the same speed or at a shifted speed, and include, e.g., a shaft, a gear mechanism, a belt, a chain, etc. In addition, such transmission members may include an engagement device that selectively transmits rotation and a driving force, such as, e.g., a friction engagement device, a meshing engagement device, etc.

MODES FOR CARRYING OUT THE INVENTION

Figure 1:
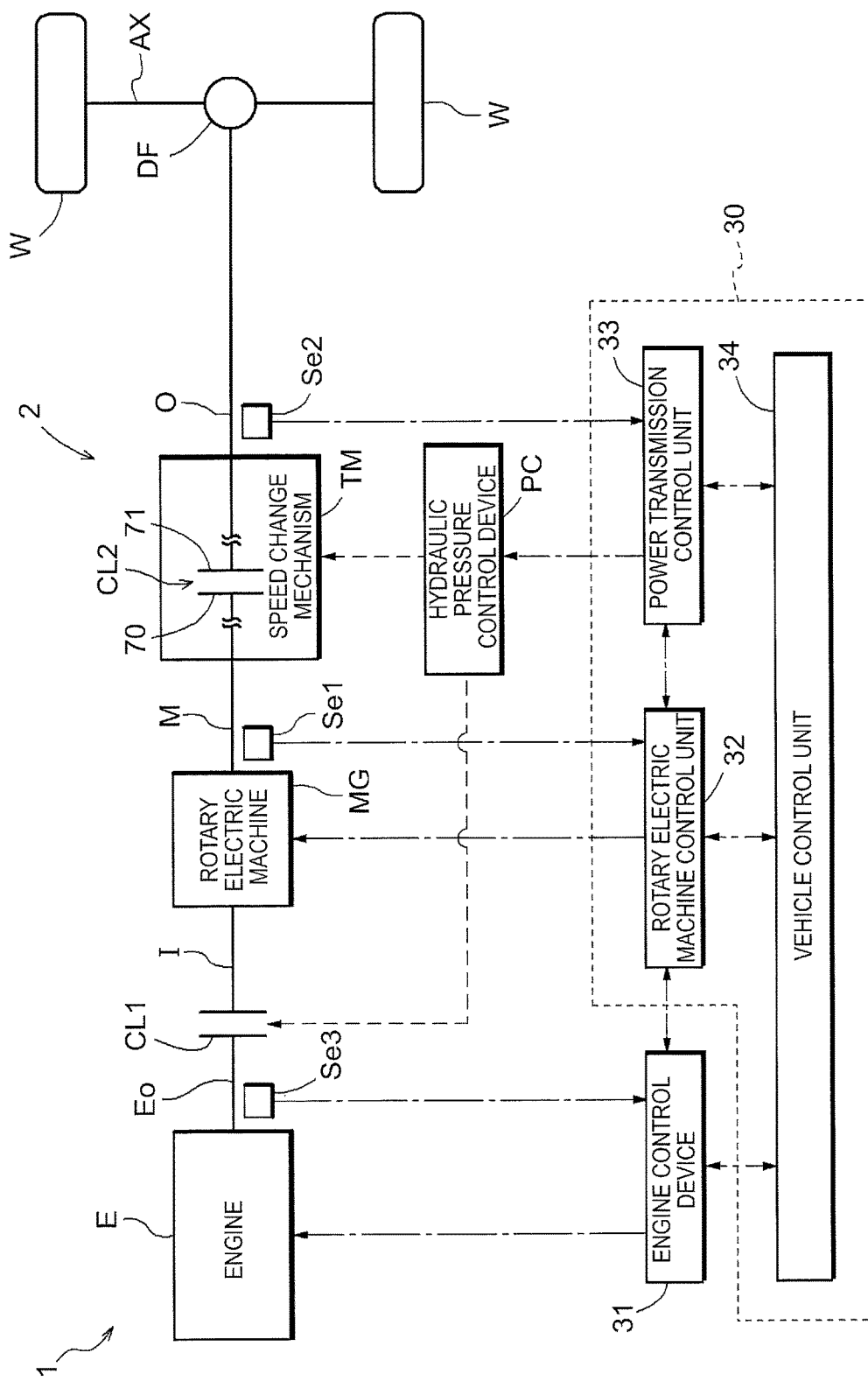
FIG. 1 is a schematic diagram showing a schematic configuration of a vehicle drive device and a control device according to an embodiment of the present invention.

A control device 30 according to an embodiment of the present invention will be described with reference to the drawings. FIG. 1 is a schematic diagram showing a schematic configuration of a vehicle drive device 1 and a control device 30 according to the present embodiment. In this figure, a solid line indicates a transmission path of a driving force, a dashed line indicates a supply path of hydraulic oil, and a dashed dotted line indicates a transmission path of signals. As shown in this figure, the vehicle drive device 1 according to the present embodiment schematically includes an engine E and a rotary electric machine MG as driving force sources and is configured to transmit a driving force from these driving force sources to wheels W through a power transmission mechanism. The vehicle drive device 1 includes a first engagement device CL1, the rotary electric machine MG, and a second engagement device CL2 in this order from the engine E on a power transmission path 2 that connects the engine E with the wheels W. The first engagement device CL1 is selectively brought into a coupled state or a released state between the engine E and the rotary electric machine MG in accordance with the engagement state. The second engagement device CL2 is selectively brought into a coupled state or a released state between the rotary electric machine MG and the wheels W in accordance with the engagement state. The vehicle drive device 1 according to the present embodiment includes a speed change mechanism TM provided on the power transmission path 2 between the rotary electric machine MG and the wheels W. The second engagement device CL2 is one of a plurality of engagement devices provided in the speed change mechanism TM.

A hybrid vehicle includes the control device 30 that controls the vehicle drive device 1. The control device 30 according to the present embodiment includes: a rotary electric machine control unit 32 that performs control for the rotary electric machine MG; a power transmission control unit 33 that performs control for the speed change mechanism TM, the first engagement device CL1, and the second engagement device CL2; and a vehicle control unit 34 that integrates these control devices and performs control for the vehicle drive device 1. In addition, the hybrid vehicle includes an engine control device 31 that performs control for the engine E.

Figure 2:
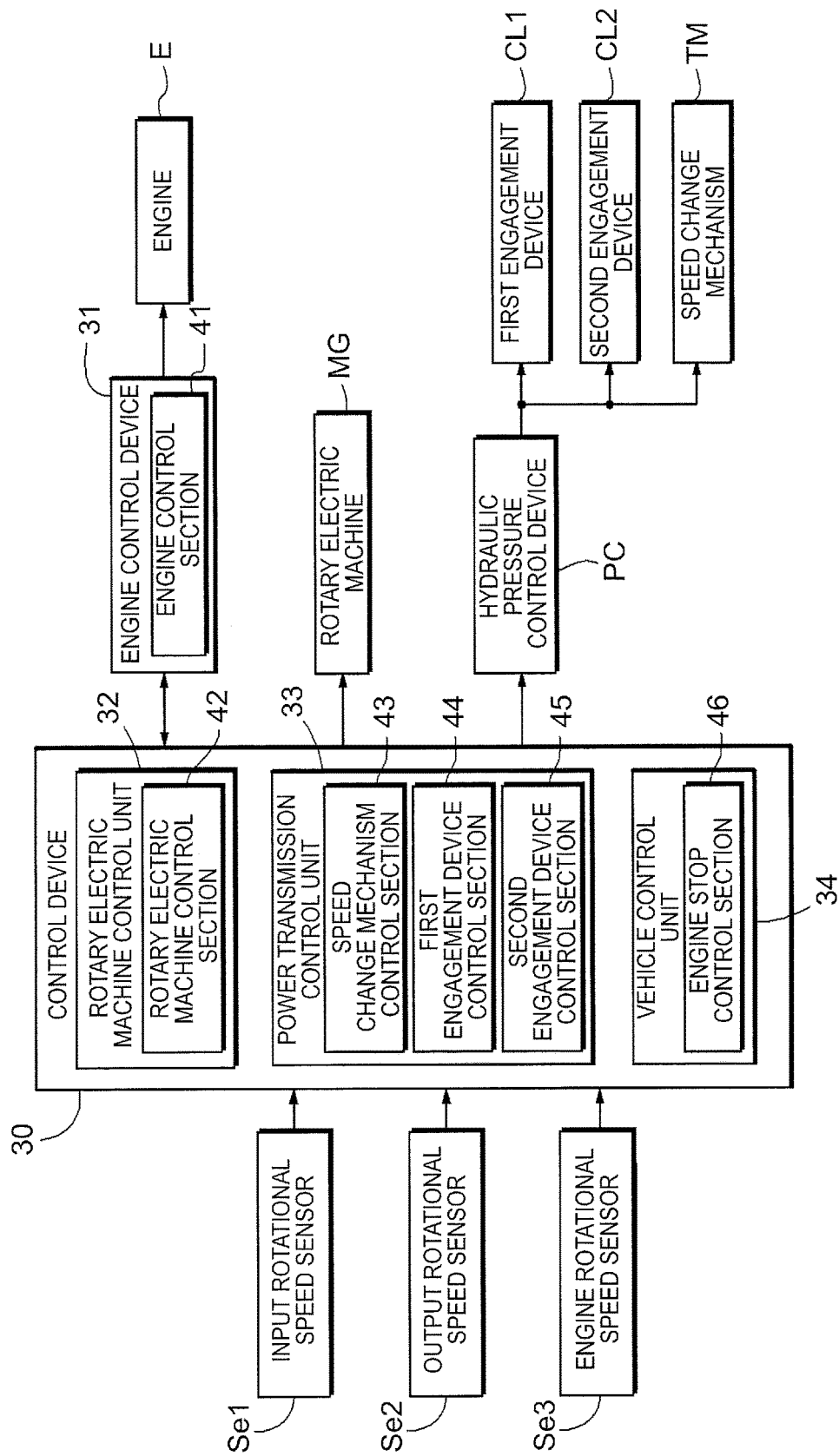
FIG. 2 is a block diagram showing a schematic configuration of the control device according to the embodiment of the present invention.

The control device 30 is provided with an engine stop control section 46 that performs stop control for the engine E (refer to FIG. 2). The engine stop control section 46 includes features of, in case of determining an operation stop of the engine E in a state in which torque is transmitted from the engine E to the wheels W, executing rotational speed control that controls output torque of the rotary electric machine MG such that a rotational speed of the rotary electric machine MG approaches a target rotational speed and executing sweep-down control that causes output torque of the engine E to decrease. The sweep-down control here corresponds to "torque-down control" in the present invention.

Hereinafter, the vehicle drive device 1 and the control device 30 according to the present embodiment are described in detail.

1. Configuration of Vehicle Drive Device 1

Initially, the configuration of the vehicle drive device 1 of a hybrid vehicle according to the present embodiment is explained. As shown in FIG. 1, the hybrid vehicle includes the engine E and the rotary electric machine MG as the driving force sources of the vehicle and is a parallel type hybrid vehicle in which the engine E and the rotary electric machine MG are drivingly coupled in series. The hybrid vehicle includes the speed change mechanism TM, and using the speed change mechanism TM, shifts the rotational speed of the engine E and the rotary electric machine MG transmitted to an intermediate shaft M, converts the torque, and transmits the resultant rotational speed and torque to an output shaft O.

The engine E is an internal combustion engine driven by combusting fuel. Various kinds of known engines, for example, a gasoline engine, a diesel engine, etc. are used as the engine E. In the present example, an engine output shaft Eo, such as a crankshaft, of the engine E is selectively drivingly coupled to an input shaft I via the first engagement device CL1. The input shaft I is drivingly coupled to the rotary electric machine MG. That is, the engine E is selectively drivingly coupled to the rotary electric machine MG via the first engagement device CL1 serving as a friction engagement element. In addition, the engine output shaft Eo is provided with a damper and is configured to be capable of damping fluctuations in output torque and rotational speed due to intermittent combustion of the engine E and transmitting the torque and rotational speed to the wheels W side.

The rotary electric machine MG includes a stator fixed to a non-rotatable member and a rotor that is rotatably supported in an inward radial direction at a position facing the stator. The rotor of the rotary electric machine MG is drivingly coupled to the input shaft I and the intermediate shaft M so as to rotate together. That is, in the present embodiment, both engine E and the rotary electric machine MG are configured to be drivingly coupled to the input shaft I and the intermediate shaft M. The rotary electric machine MG is electrically connected to a battery serving as an electricity storage device via an inverter device that performs conversion between direct current and alternating current. The rotary electric machine MG is capable of performing a function as a motor (an electric motor) that generates motive power when receiving electric power supply and a function as a generator (an electric generator) that generates electric power when receiving motive power supply. That is, the rotary electric machine MG is supplied with electric power from the battery to perform power running, or generates electric power using a rotational driving force transmitted from the engine E or the wheels W to store the generated electric power in the battery via the inverter.

The intermediate shaft M that is drivingly coupled to the driving force sources is drivingly coupled to the speed change mechanism TM. In the present embodiment, the speed change mechanism TM is an automatic speed change mechanism that includes a plurality of shift speeds with different speed ratios. In order to establish the plurality of shift speeds, the speed change mechanism TM includes a gear mechanism such as a planetary gear mechanism, and a plurality of engagement devices. In the present embodiment, one of the plurality of engagement devices is the second engagement device CL2. The speed change mechanism TM shifts the rotational speed of the intermediate shaft M at a speed ratio set for each shift speed and converts the torque thereof, and transmits the resultant rotational speed and torque to the output shaft O. The torque transmitted from the speed change mechanism TM to the output shaft O is distributed and transmitted to axle shafts AX on the right and left sides through an output differential gear device DF, and thereafter transmitted to the wheels W that are coupled to the respective axle shafts AX. The speed ratio here is a ratio of the rotational speed of the intermediate shaft M to the rotational speed of the output shaft O when each shift speed is established in the speed change mechanism TM. In the present application, the speed ratio is a value acquired by dividing the rotational speed of the intermediate shaft M by the rotational speed of the output shaft O. That is, the rotational speed acquired by dividing the rotational speed of the intermediate M by the speed ratio is the rotational speed of the output shaft O. In addition, the torque acquired by multiplying the torque transmitted from the intermediate shaft M to the speed change mechanism TM by the speed ratio is the torque transmitted from the speed change mechanism TM to the output shaft O.

In the present example, a plurality of engagement devices (including the second engagement device CL2) in the speed change mechanism TM and the first engagement device CL1 are friction engagement elements such as clutches, brakes, etc., each including friction members. These friction engagement elements are capable of continuously controlling an increase and a decrease in a transmission torque capacity through control of engagement pressure by controlling hydraulic pressure that is supplied. It is preferable to utilize, for example, a wet multi-plate clutch, a wet multi-plate brake, etc. as such friction engagement elements.

The friction engagement element transmits torque between engagement members with friction between the engagement members. In a case in which there is a rotational difference (slip) between the engagement members of the friction engagement element, the torque (slip torque) of the magnitude of the transmission torque capacity is transmitted from the member with a higher rotational speed to the member with a lower rotational speed with dynamic friction. In a case in which there is no rotational difference (slip) between the engagement members of the friction engagement element, the friction engagement element transmits the torque acting between the engagement members of the friction engagement element with static friction up to the magnitude of the transmission torque capacity. The transmission torque capacity here is the maximum magnitude of torque that can be transmitted with friction by the friction engagement element. The magnitude of the transmission torque capacity changes in proportion to the engagement pressure of the friction engagement element. The engagement pressure is a pressure at which an input-side engagement member (a friction plate) and an output-side engagement member (a friction plate) press each other. In the present embodiment, the engagement pressure changes in proportion to the magnitude of the hydraulic pressure that is supplied. That is, in the present embodiment, the magnitude of the transmission torque capacity changes in proportion to the magnitude of the hydraulic pressure that is supplied to the friction engagement element.

Each friction engagement element includes a return spring and is urged toward a disengagement side by a reaction force of the spring. When the force generated by the hydraulic pressure that is supplied to a hydraulic cylinder of each friction engagement element exceeds the reaction force of the spring, the transmission torque capacity starts to be generated in the friction engagement element and the friction engagement element changes from the disengaged state to the engaged state. The hydraulic pressure at the time when the transmission torque capacity starts to be generated is referred to as "stroke end pressure." Each friction engagement element is configured such that the transmission torque capacity increases in proportion to the increase in the hydraulic pressure after the hydraulic pressure that is supplied exceeds the stroke end pressure. In addition, the friction engagement element may be configured not to include a return spring and to control the transmission torque capacity with differential pressure generated on both sides of a piston of the hydraulic cylinder.

In the present embodiment, the engaged state means a state in which transmission torque capacity is generated in the friction engagement element and includes the slip engaged state and the direct engaged state. The disengaged state means a state in which no transmission torque capacity is generated in the friction engagement element. The slip engaged state means an engaged state in which there is a rotational speed difference (slip) between the engagement members of the friction engagement element. The direct engaged state means an engaged state in which there is no rotational speed difference (slip) between the engagement members of the friction engagement element. In addition, a non-direct engaged state means an engaged state other than the direct engaged state and includes the disengaged state and the slip engaged state.

Note that there are cases in which transmission torque capacity is generated in the friction engagement element due to drag between the engagement members (friction members) even in a case in which a request to generate transmission torque capacity is not provided by the control device 30. For example, even in a case in which the friction members are not pressed to each other by the piston, there are cases in which the friction members contact with each other and transmission torque capacity is generated due to drag between the friction members. Thus, the term "disengaged state" also includes a state in which transmission torque capacity is generated due to drag between the friction members in a case in which a request to generate transmission torque capacity is not provided by the control device 30.

In a case in which the second engagement device CL2 is a clutch, the difference in the rotational speed between the two engagement members is the difference between the rotational speed of the engagement member on the rotary electric machine MG side and the rotational speed of the engagement member on the wheels W side in relation to the second engagement device CL2. In a case in which the second engagement device CL2 is a brake, the difference in the rotational speed between the two engagement members is the difference between the rotational speed (i.e., zero) of the engagement member on the non-rotatable member side such as a case and the rotational speed of the engagement member on the rotary electric machine MG and wheels W side.

2. Configuration of Hydraulic Control System

A hydraulic control system of the vehicle drive device 1 includes a hydraulic pressure control device PC that regulates the hydraulic pressure of hydraulic oil that is supplied from an oil pump to a predetermined pressure. The oil pump is driven by a driving force source of the vehicle or an exclusive motor. Detailed explanation is not provided here. However, note that the hydraulic pressure control device PC regulates the extent of the opening of one or more regulating valves based on a signal pressure from a linear solenoid valve for hydraulic pressure regulation to regulate the amount of the hydraulic oil that is drained from the one or more regulating valves and to regulate the hydraulic pressure of the hydraulic oil to one or more predetermined pressures. The hydraulic oil regulated to the predetermined pressures is supplied to the speed change mechanism TM, the respective friction engagement elements of the first engagement device CL1 and the second engagement device CL2, etc. at the respective required pressure levels.

3. Configuration of Control Device

Next, the configurations of the control device 30 and the engine control device 31 that controls the vehicle drive device 1 are explained with reference to FIG. 2.

The control units 32 to 34 in the control device 30 and the engine control device 31 each include, as a core member, an arithmetic processing device such as a CPU, etc., and include a storage device such as a RAM (random access memory) capable of reading and writing data from and into the arithmetic processing device, a ROM (read only memory) capable of reading data from the arithmetic processing device, etc. Respective function sections 41 to 46, etc. in the control device 30 are configured by software (program) stored in the ROM in the control device or separately provided hardware, or both. The control units 32 to 34 in the control device 30 and the engine control device 31 are configured to communicate with each other, and share various kinds of information such as detected information of sensors and control parameters, etc. and perform cooperative control, to realize the functions of the respective function sections 41 to 46.

In addition, the vehicle drive device 1 includes sensors Se1 to Se3. Electric signals outputted from the respective sensors are inputted to the control device 30 and the engine control device 31. The control device 30 and the engine control device 31 calculate the detected information of the respective sensors based on the inputted electric signals.

The input rotational speed sensor Se1 is a sensor that detects the rotational speed of the input shaft I and the intermediate shaft M. The input shaft I and the intermediate shaft M are drivingly coupled to the rotor of the rotary electric machine MG in an integrated manner. Therefore, the rotary electric machine control unit 32 detects the rotational speed (angular speed) of the rotary electric machine MG and the rotational speed of the input shaft I and the intermediate shaft M based on the inputted signals of the input rotational speed sensor Se1. The output rotational speed sensor Se2 is a sensor that detects the rotational speed of the output shaft O. The power transmission control unit 33 detects the rotational speed (angular speed) of the output shaft O based on the inputted signals of the output rotational speed sensor Se2. In addition, the rotational speed of the output shaft O is proportional to the vehicle speed. Therefore, the power transmission control unit 33 calculates the vehicle speed based on the inputted signals of the output rotational speed sensor Se2. The engine rotational speed sensor Se3 is a sensor that detects the rotational speed of the engine output shaft Eo (engine E). The engine control device 31 detects the rotational speed (angular speed) of the engine E based on the inputted signals of the engine rotational speed sensor Se3.

3-1. Engine Control Device 31

The engine control device 31 includes an engine control section 41 that performs operation control for the engine E. In the present embodiment, in a case in which engine required torque is requested by the vehicle control unit 34, the engine control section 41 sets, as an output torque request value, the engine required torque requested by the vehicle control unit 34, and performs torque control that causes the engine E to output the torque of the output torque request value. In addition, in a case in which a request to stop combustion of the engine E is provided by the engine stop control section 46, the engine control device 31 determines that the combustion stop of the engine E has been requested, and stops the combustion of the engine E by stopping a fuel supply to the engine E, an ignition of the engine E, etc.

3-2. Power Transmission Control Unit 33

The power transmission control unit 33 includes a speed change mechanism control section 43 that performs control for the speed change mechanism TM, a first engagement device control section 44 that performs control for the first engagement device CL1, and a second engagement device control section 45 that performs control for the second engagement device CL2 during the start control of the engine E.

3-2-1. Speed Change Mechanism Control Section 43

The speed change mechanism control section 43 performs control that establishes each shift speed in the speed change mechanism TM. The speed change mechanism control section 43 determines a target shift speed in the speed change mechanism TM based on sensor detected information such as a vehicle speed, an extent of opening of an accelerator, a shift position, etc. The speed change mechanism control section 43 controls the hydraulic pressure that is supplied to a plurality of engagement devices provided in the speed change mechanism TM through the hydraulic pressure control device PC to engage or disengage the respective engagement devices and establish the target shift speed in the speed change mechanism TM. Specifically, the speed change mechanism control section 43 provides a request for a target hydraulic pressure (request pressure) with respect to each engagement device to the hydraulic pressure control device PC. The hydraulic pressure control device PC supplies the hydraulic pressure of the requested target hydraulic pressure (request pressure) to each engagement device.

3-2-2. First Engagement Device Control Section 44

The first engagement device control section 44 controls the engagement state of the first engagement device CL1. In the present embodiment, the first engagement device control section 44 controls the hydraulic pressure that is supplied to the first engagement device CL1 through the hydraulic pressure control device PC so as to approach a first target torque capacity requested by the vehicle control unit 34. Specifically, the first engagement device control section 44 provides a request for a target hydraulic pressure (request pressure) that is set based on the first target torque capacity to the hydraulic pressure control device PC. The hydraulic pressure control device PC controls the hydraulic pressure that is supplied to the first engagement device CL1 using the requested target hydraulic pressure (request pressure) as control target.

3-2-3. Second Engagement Device Control Section 45

The second engagement device control section 45 controls the engagement state of the second engagement device CL2 during the start control of the engine E. In the present embodiment, the second engagement device control section 45 controls the hydraulic pressure that is supplied to the second engagement device CL2 through the hydraulic pressure control device PC such that the transmission torque capacity of the second engagement device CL2 approaches a second target torque capacity requested by the vehicle control unit 34. Specifically, the second engagement device control section 45 provides a request for a target hydraulic pressure (request pressure) that is set based on the second target torque capacity to the hydraulic pressure control device PC. The hydraulic pressure control device PC controls the hydraulic pressure that is supplied to the second engagement device CL2 using the requested target hydraulic pressure (request pressure) as control target.

In the present embodiment, the second engagement device CL2 is one of a single or a plurality of engagement devices that establish each shift speed in the speed change mechanism TM. The engagement device of the speed change mechanism TM utilized as the second engagement device CL2 may be changed according to the established shift speed, or may be the same engagement device.

3-3. Rotary Electric Machine Control Unit 32

The rotary electric machine control unit 32 includes a rotary electric machine control section 42 that performs operation control for the rotary electric machine MG. In the present embodiment, when rotary electric machine required torque is requested by the vehicle control unit 34, the rotary electric machine control section 42 sets, as an output torque request value, rotary electric machine required torque requested by the vehicle control unit 34 and controls the rotary electric machine MG so as to output the torque of the output torque request value. Specifically, the rotary electric machine control section 42 controls output torque of the rotary electric machine MG through on-off control for a plurality of switching elements provided in the inverter.

3-4. Vehicle Control Unit 34

The vehicle control unit 34 includes a function section that performs control that integrates, as a whole vehicle, various kinds of torque control performed with respect to the engine E, the rotary electric machine MG the speed change mechanism TM, the first engagement device CL1, the second engagement device CL2, etc., the engagement control for the respective engagement devices, etc.

The vehicle control unit 34 calculates, in accordance with the extent of opening of the accelerator, the vehicle speed, the amount of electric power stored in the battery, etc., torque required to drive the wheels W, that is, vehicle required torque that is a target driving force that is transmitted from the rotary electric machine MG to the wheels W, and determines a drive mode of the engine E and the rotary electric machine MG. The vehicle control unit 34 performs integrated control by calculating the engine required torque that is output torque required of the engine E, the rotary electric machine required torque that is output torque required of the rotary electric machine MG the first target torque capacity that is transmission torque capacity required of the first engagement device CL1, the second target torque capacity that is transmission torque capacity required of the second engagement device CL2, and providing requests for the calculated values to the other control units 32 and 33 and the engine control device 31.

The vehicle control unit 34 determines an operation mode of the driving force source based on the extent of opening of the accelerator, the vehicle speed, the shift position, the amount of electric power stored in the battery, etc. In the present embodiment, the operation mode includes the electric power mode using only the rotary electric machine MG as the driving force source and the parallel mode using at least the engine E as the driving force source, etc. For example, in a case in which the amount of electric power stored in the battery becomes greater than or equal to a charge limit determination value, the vehicle control unit 34 changes the operation mode from the parallel mode to the electric power mode.

In the present embodiment, in a case in which the operation mode is determined to the parallel mode, the vehicle control unit 34 basically controls to cause the engine E to rotate for combustion and the first engagement device CL1 so as to be in the direct engaged state or in the slip engaged state. In the parallel mode, the vehicle is driven using the driving force of the engine E and rotary electric machine MG and the rotary electric machine MG generates electric power using the driving force of the engine E.

In a case in which the operation mode is determined to the electric power mode, the vehicle control unit 34 basically controls the first engagement device CL1 so as to be in the disengaged state and stops the combustion of the engine E to stop the rotation. Thereby, the engine E is disconnected from the rotary electric machine MG and the vehicle is driven only by the driving force of the rotary electric machine MG.

In the present embodiment, the vehicle control unit 34 includes the engine stop control section 46 that performs stop control for the engine E. Specifically, the engine stop control section 46 causes the first engagement device CL1 to transition to the disengaged state and stops the combustion of the engine E to stop the rotation, for example, in a case in which the operation mode is changed from the parallel mode to the electric power mode.

Hereinafter, the engine stop control section 46 is explained in detail.

3-4-1. Engine Stop Control Section 46

In a case in which the engine stop control section 46 determines to stop the operation of the engine E in a state in which torque is transmitted from the engine E to the wheels W, the engine stop control section 46 executes the rotational speed control that controls the output torque of the rotary electric machine MG such that the rotational speed of the rotary electric machine MG approaches the target rotational speed and executes the sweep-down control that causes the output torque of the engine E to decrease.

Hereinafter, engine stop control is explained in detail with reference to the flow chart shown in FIG. 3, and the timing charts shown in FIGS. 4 to 7.

3-4-1-1. Schematic Configuration of Engine Stop Control

Initially, a schematic configuration of the engine stop control is explained with reference to the flow chart shown in FIG. 3.

<Step #01>

In a case in which the engine stop control section 46 determines to stop the operation of the engine E in a state in which the torque is transmitted from the engine E to the wheels W (Step #01: Yes), the engine stop control section 46 starts a series of engine stop control.

In the present embodiment, the engine stop control section 46 is configured to start a series of engine stop control in a case in which the engine stop control section 46 determines to stop the operation of the engine E in a state in which positive torque that is torque to drive the wheels W in a forward direction is transmitted from the rotary electric machine MG side to the wheels W side. For example, the engine stop control section 46 determines to stop the operation of the engine E in a case in which the amount of electric power stored in the battery becomes greater than or equal to a charge limit determination value and the operation mode is changed from the parallel mode to the electric power mode.

<Step #02>

In the present embodiment, the engine stop control section 46 is configured to start control that causes the second engagement device CL2 to be in the slip engaged state (Step #02) in a case in which the engine stop control section 46 determines to stop the operation of the engine E (Step #01: Yes).

In a case in which the second engagement device CL2 is already controlled so as to be in the slip engaged state, the engine stop control section 46 continues to control the second engagement device CL2 so as to be in the slip engaged state. In a case in which the second engagement device CL2 is in the direct engaged state, the engine stop control section 46 controls the second engagement device CL2 so as to be in the slip engaged state by performing transition control that causes the second engagement device CL2 to transition from the direct engaged state to the slip engaged state.

<Step #03>

In a case in which the engine stop control section 46 determines to stop the operation of the engine E (Step #01: Yes), the engine stop control section 46 starts execution of the rotational speed control that controls the output torque of the rotary electric machine MG such that the rotational speed of the rotary electric machine MG approaches the target rotational speed (Step #03).

In the present embodiment, the engine stop control section 46 is configured to set, as the target rotational speed, a rotational speed acquired by adding a predetermined off-set value to the synchronous rotational speed such that the rotational speed difference between the engagement members of the second engagement device CL2 is a constant rotational speed difference. Because the rotational speed control maintains the rotational speed difference of the second engagement device CL2, the second engagement device CL2 is stably maintained in the slip engaged state. The synchronous rotational speed is a rotational speed of the rotary electric machine MG in a case in which the second engagement device CL2 is in the direct engaged state. In more detail, the synchronous rotational speed is a rotational speed of the rotary electric machine MG that is required to bring the rotational speed difference between the engagement members of the second engagement device CL2 into zero in a state in which the rotational speed of the output shaft O is the current rotational speed. In the present embodiment, the engine stop control section 46 is configured to calculate the synchronous rotational speed by multiplying the rotational speed of the output shaft O by a speed ratio of the speed change mechanism TM.

The rotational speed control for the rotary electric machine MG includes various kinds of feedback control such as PID control, etc.

<Step #04>

In a case in which the engine stop control section 46 determines the operation stop of the engine E (Step #01: Yes), the engine stop control section 46 starts execution of the sweep-down control (hereinafter, referred to as sweep-down control for the engine E) that causes the output torque of the engine E to decrease down to a torque decrease value that is previously set (Step #04).

In the present embodiment, the torque decrease value is set to zero. The engine stop control section 46 is configured to cause the engine required torque to gradually decrease down to zero. Alternatively, the torque decrease value may be set to a value less than zero, or a value greater than zero.

<Step #05>

The engine stop control section 46 starts the sweep-down control (hereinafter, referred to as sweep-down control for the first engagement device CL1) that causes the engagement pressure of the first engagement device CL1 to decrease in accordance with the decrease in the output torque of the engine E due to the sweep-down control for the engine E (Step #05).

In present embodiment, the engine stop control section 46 is configured to cause the first target torque capacity (engagement pressure) of the first engagement device CL1 to gradually decrease down to the torque decrease value (zero in the present embodiment) in accordance with the decrease in the output torque of the engine E such that the transmission torque capacity (excluding drag torque) of the first engagement device CL1 coincides with the magnitude of the output torque of the engine E. For example, the engine stop control section 46 is configured to cause the first target torque capacity of the first engagement device CL1 to gradually decrease from a value of the magnitude that is equal to the engine required torque before starting the sweep-down control for the engine E to zero at the same rate of change as the rate of change of the engine required torque. Note that either or both of feedforward control and feedback control cause the engagement pressure of the first engagement device CL1 to decrease, as described later.

<Step #06>

The engine stop control section 46 executes determination process that determines whether the first engagement device CL1 has been brought into the disengaged state (Step #06). The determination process is described later.

<Step #07>

After the engine stop control section 46 determines that the first engagement device CL1 has been brought into the disengaged state (Step #06: Yes), the engine stop control section 46 stops the combustion of the engine E (Step #07).

<Step #08, Step #09>

In addition, after the engine stop control section 46 determines that the first engagement device CL1 has been brought into the disengaged state (Step #06: Yes), the engine stop control section 46 executes transition control that causes the second engagement device CL2 to transition from the slip engaged state to the direct engaged state (Step #09). In the present embodiment, the engine stop control section 46 is configured to stop the combustion of the engine E at Step #07, and thereafter execute transition control that causes the second engagement device CL2 to transition from the slip engaged state to the direct engaged state (Step #09).

In addition, in the present embodiment, the engine stop control section 46 is configured to execute the transition control that causes the second engagement device CL2 to transition from the slip engaged state to the direct engaged state (Step #09) in a case in which the engine stop control section 46 determines that the rotational speed of the engine E achieves the direct engagement start speed that is set in accordance with the synchronous rotational speed (Step #08: Yes) after stopping the combustion of the engine E. Note that the engine stop control section 46 may be configured to execute the transition control that causes the second engagement device CL2 to transition from the slip engaged state to the direct engaged state (Step #09) after determining that the first engagement device CL1 has been brought into the disengaged state, without performing the determination at Step #08.

3-4-1-2. Detailed Explanation for Behavior of Engine Stop Control

Hereinafter, a first example to a fourth example of the engine stop control are sequentially explained with reference to the timing charts shown in FIGS. 4 to 7.

3-4-1-2-1. First Example (in a Case in which the Second Engagement Device CL2 is in the Slip Engaged State (No. 1))

Initially, the first example of the engine stop control is explained with reference to the timing chart shown in FIG. 4. The first example exemplifies a case in which the second engagement device CL2 is in the slip engaged state before starting the engine stop control.

<Initial State Before Starting the Engine Stop Control>

In an initial state before starting the engine stop control (time t01), the operation mode is determined to the parallel mode to cause the engine E to rotate for combustion. Torque (positive torque) is transmitted from the engine E to the wheels W. In the present embodiment, the vehicle control unit 34 sets positive torque as the vehicle required torque and performs integrated control for the engine E, the rotary electric machine MG the first engagement device CL1, and the second engagement device CL2 such that the positive torque that drives the wheels W in a travel direction (a forward direction in the example shown in FIG. 4) is transmitted from the rotary electric machine MG side to the wheels W side. In other words, the vehicle control unit 34 does not perform control such that negative torque that drives (brake) the wheels W in a direction opposite the travel direction is transmitted.

Figure 4:
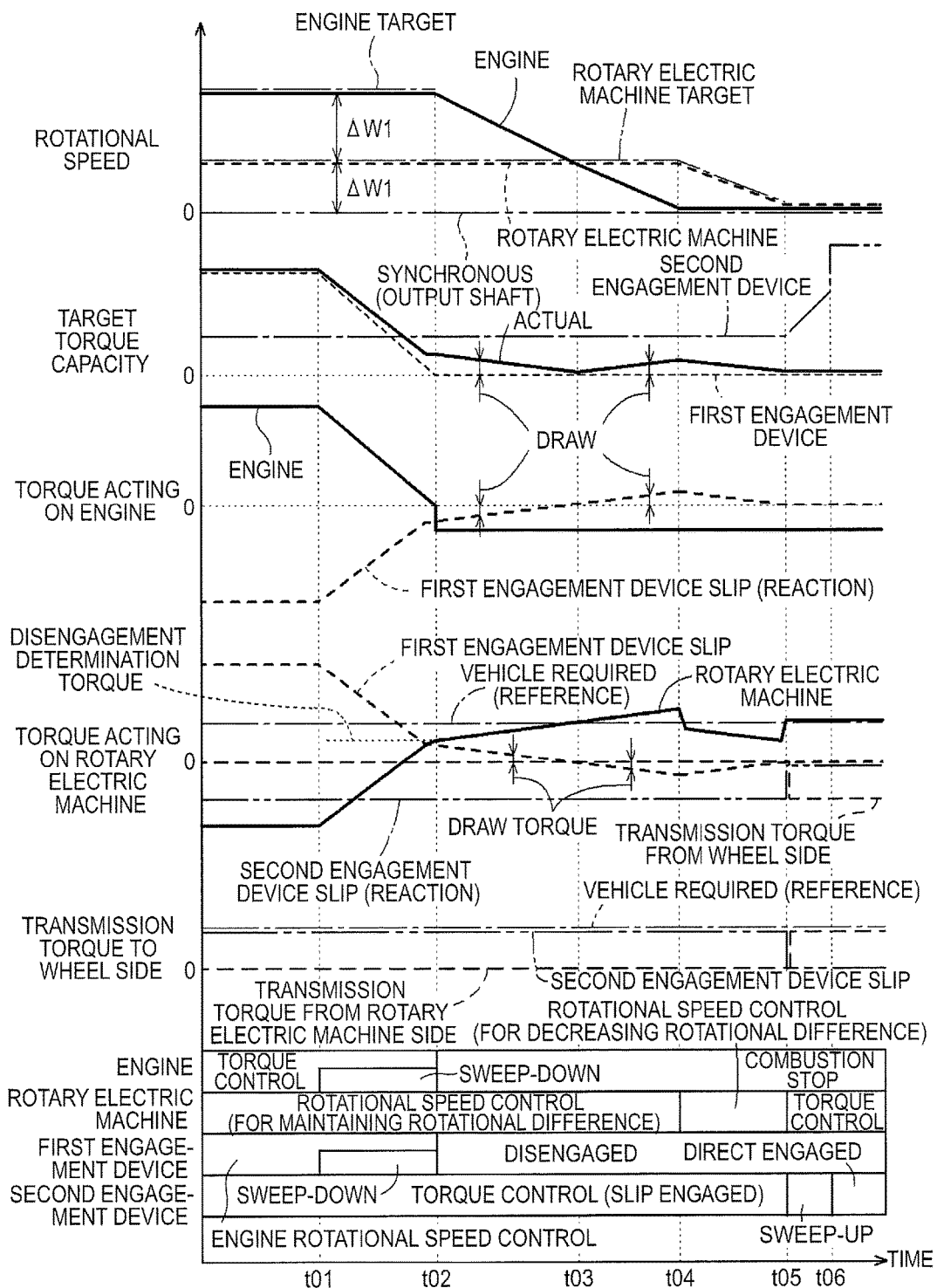
FIG. 4 is a timing chart illustrating a first example of the processing of the operation stop of the internal combustion engine according to the embodiment of the present invention.

In the example shown in FIG. 4, the driving force of the engine E drives the vehicle and causes the rotary electric machine MG to generate electric power. That is, the vehicle control unit 34 performs the integrated control such that the engine required torque becomes the total of the vehicle required torque and an absolute value of target electric power generation torque (negative torque) of the rotary electric machine MG and the rotary electric machine required torque achieves the target electric power generation torque (negative torque) of the rotary electric machine MG.

In the example shown in FIG. 4, in order to maintain the rotational speed of the engine E to be greater than or equal to the rotational speed, such as an idling rotational speed, etc., at which the engine E can continue self-sustained operation in a state in which the vehicle speed (rotational speed of the output shaft O) is low, the second engagement device CL2 is controlled so as to be in the slip engaged state.

Even in a case in which the transmission torque capacity of the second engagement device CL2 is the same, an amount of heat generation by friction between the engagement members of the second engagement device CL2 increases as the rotational speed difference $\Delta W2$ between the engagement members of the second engagement device CL2 increases. In the example shown in FIG. 4, in order to reduce the amount of heat generation of the second engagement device CL2, the first engagement device CL1 is controlled so as to be in the slip engaged state. In addition, the vehicle control unit 34 is configured to administrate the rotational speed difference $\Delta W2$ between the rotational speed of the rotary electric machine MG and the synchronous rotational speed as the rotational speed difference between the engagement members of the second engagement device CL2.

The vehicle control unit 34 performs torque control that sets a total value of the vehicle required torque and the absolute value of the target electric power generation torque (negative torque) of the rotary electric machine MG as the engine required torque.

The vehicle control unit 34 performs rotational speed control for the engine E that controls the first target torque capacity (engagement pressure) of the first engagement device CL1 such that the rotational speed of the engine E approaches the target rotational speed of the engine E. In a case in which the target rotational speed of the engine E is constant, that is, does not change, the inertia torque does not occur and the torque (slip torque) that is transmitted from the engine E side to the rotary electric machine MG side through the first engagement device CL1 that is in the slip engaged state is approximately equal to the output torque of the engine E. In FIG. 4, the slip torque that is transmitted from the engine E side to the rotary electric machine MG side through the first engagement device CL1 that is in the slip engaged state is indicated as the first engagement device slip torque and corresponds to the torque acting on the rotary electric machine MG. The slip torque that is transmitted from the rotary electric machine MG side to the engine E side as the reaction is indicated as the first engagement device slip torque (reaction) and corresponds to the torque acting on the engine E.

The vehicle control unit 34 performs torque control that sets a value of the vehicle required torque as the second target torque capacity (engagement pressure) of the second engagement device CL2. The torque (slip torque) transmitted from the rotary electric machine MG to the wheels W side through the second engagement device CL2 that is in the slip engaged state becomes substantially equal to the vehicle required torque. FIG. 4 indicates the slip torque transmitted from the rotary electric machine MG side to the wheels W side through the second engagement device CL2 that is in the slip engaged state as the second engagement device slip torque and corresponds to the transmission torque to the wheels W side. The slip torque that is transmitted from the wheels W side to the rotary electric machine MG side as the reaction is indicated as the second engagement device slip torque (reaction) and corresponds to the torque acting on the rotary electric machine MG.

In order to maintain the rotational speed difference $\Delta W2$ between engagement members of the second engagement device CL2, the vehicle control unit 34 sets the rotational speed acquired by adding a predetermined off-set value to the synchronous rotational speed as the target rotational speed and performs the rotational speed control that controls the output torque of the rotary electric machine MG such that the rotational speed of the rotary electric machine MG approaches the target rotational speed.

As described above, the torque that corresponds to the output torque of the engine E is transmitted from the first engagement device CL1 side to the rotary electric machine MG. The torque that corresponds to the vehicle required torque is transmitted from the rotary electric machine MG to the second engagement device CL2 side. Therefore, the torque that is acquired by subtracting the vehicle required torque from the output torque of the engine E acts on the rotary electric machine MG. In order to maintain the rotational speed of the rotary electric machine MG at the target rotational speed, the output torque of the rotary electric machine MG changes so as to cancel the torque acting on the rotary electric machine MG. Specifically, the output torque of the rotary electric machine MG is torque given by inverting positive and negative of the torque that is acquired by subtracting the vehicle required torque from the output torque of the engine E.

<Start of Engine Stop Control (Step #01)>

In the example shown in FIG. 4, in a case in which the amount of electric power stored in the battery becomes greater than or equal to the charge limit determination value by causing the rotary electric machine MG to generate electric power, the vehicle control unit 34 changes the operation mode from the parallel mode to the electric power mode, and determines an operation stop of the engine E (time t01). In a case in which the operation stop of the engine E is determined in a state in which positive torque is transmitted from the rotary electric machine MG side to the wheels W side (FIG. 3, Step #01: Yes), the engine stop control section 46 starts a series of engine stop control (time t01).

<Start of Control that Brings the Second Engagement Device CL2 into the Slip Engaged State (Step #02)>

Figure 3:
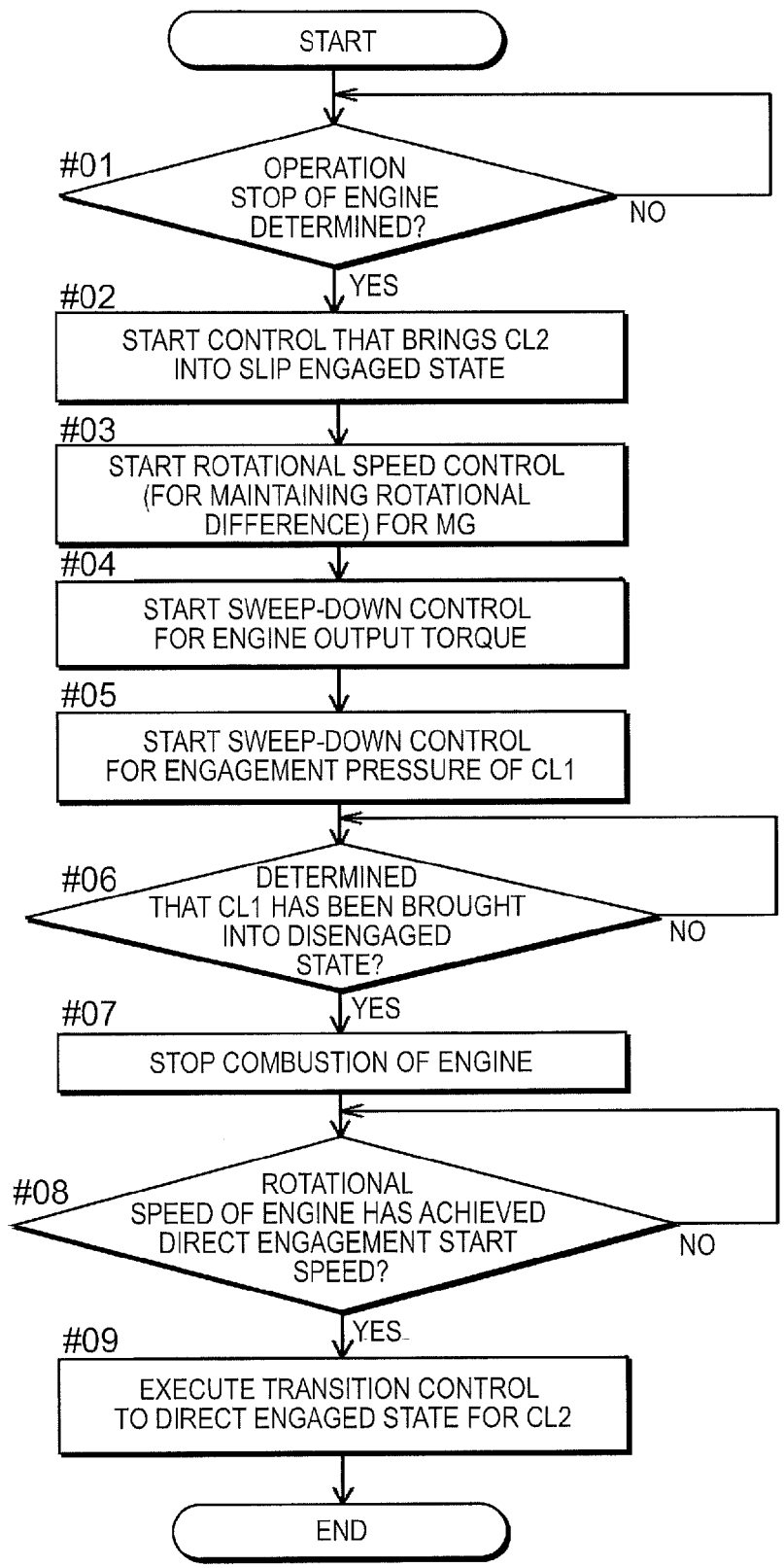
FIG. 3 is a flow chart showing processing of an operation stop of an internal combustion engine according to the embodiment of the present invention.

In a case in which the engine stop control section 46 determines an operation stop of the engine E, the engine stop control section 46 starts control that brings the second engagement device CL2 into the slip engaged state (FIG. 3, Step #02; time t01).

In the example shown in FIG. 4, the second engagement device CL2 is already controlled so as to be in the slip engaged state. Therefore, the second engagement device CL2 is continuously controlled so as to be in the slip engaged state. The engine stop control section 46 continues the torque control that sets the value of the vehicle required torque as the second target torque capacity (engagement pressure) of the second engagement device CL2. Because the second engagement device CL2 is controlled so as to be in the slip engaged state, the torque that is transmitted from the rotary electric machine MG side to the wheels W side through the second engagement device CL2 is the slip torque that corresponds to the transmission torque capacity of the second engagement device CL2. Therefore, in a case in which torque fluctuation caused by the engine stop control is transmitted from the rotary electric machine MG side to the second engagement device CL2, it is possible to prevent the torque fluctuation from being transmitted to the wheels W side.

<Start of Rotational Speed Control (Maintaining Rotational Difference) of the Rotary Electric Machine MG (Step #03)>

In a case in which the engine stop control section 46 determines an operation stop of the engine E, the engine stop control section 46 starts the execution of the rotational speed control for the rotary electric machine MG (FIG. 3, Step #03; time t01).

In the example shown in FIG. 4, the rotational speed control for the rotary electric machine MG is already in execution. Therefore, the rotational speed control continues to be executed. The engine stop control section 46 continues setting the rotational speed acquired by adding the predetermined off-set value to the synchronous rotational speed as the target rotational speed and executes the rotational speed control to maintain rotational difference.

<Start of Sweep-Down Control of Engine Output Torque (Step #04)>

In a case in which the engine stop control section 46 determines an operation stop of the engine E, the engine stop control section 46 starts execution of the sweep-down control for the engine E that causes the output torque of the engine E to decrease down to the torque decrease value that is previously set (FIG. 3, Step #04; time t01).

In the example shown in FIG. 4, the engine stop control section 46 causes the engine required torque to gradually decrease from a value set based on the vehicle required torque and the electric power generation torque (absolute value) of the rotary electric machine MG down to zero at a constant rate of change (time t01 to time t02). Note that the rate of change may not be constant during the execution of the sweep-down control, but may be variable.

<Start of Sweep-Down Control of Engagement Pressure of First Engagement Device CL1 (Step #05)>

The engine stop control section 46 starts the sweep-down control for the first engagement device CL1 that causes the engagement pressure of the first engagement device CL1 decrease, in accordance with the decrease in the output torque of the engine E due to the sweep-down control for the engine E (FIG. 3, Step #05; time t01).

In the example shown in FIG. 4, the engagement pressure of the first engagement device CL1 is caused to decrease in accordance with the decrease in the output torque of the engine E by both the feedforward control and the feedback control.

The engine stop control section 46 executes the feedforward control that causes the first target torque capacity of the first engagement device CL1 to decrease from a value before starting the sweep-down control for the first engagement device CL1 to zero at the same rate of change as the rate of change of the engine required torque (time t01 to time t02). In the example shown in FIG. 4, the rotational speed control causes the first target torque capacity before starting the sweep-down control for the first engagement device CL1 to be around the magnitude of the output torque of the engine E. Thereby, through the feedforward control, the first target torque capacity of the first engagement device CL1 can be caused to decrease in accordance with the decrease in the output torque of the engine E.

In a case in which the first engagement device CL1 is controlled so as to be in the slip engaged state, as the example shown in FIG. 4, the engine stop control section 46 is configured to execute the feedback control that controls the engagement pressure of the first engagement device CL1 such that the rotational speed of the engine E approaches the target rotational speed during the execution of the sweep-down control for the engine E.

Along with the decrease in the output torque of the engine E, the rotational speed of the engine E tries to lower. Against such effect, in order to maintain the rotational speed of the engine E at the target rotational speed, the engagement pressure of the first engagement device CL1 is caused to decrease, and the slip torque transmitted from the engine E side to the rotary electric machine MG side though the first engagement device CL1 that is in the slip engaged state decreases. Thereby, the feedback control is capable of causing the engagement pressure of the first engagement device CL1 to decrease in accordance with the decrease in the output torque of the engine E. By performing the feedforward control, a responsiveness of the decrease in the first target torque capacity of the first engagement device CL1 in response to the decrease in the output torque of the engine E can be improved.

The engagement pressure of the first engagement device CL1 may be configured to be caused to decrease by either one or both of the feedforward control and feedback control.

<Increase of Output Torque of Rotary Electric Machine MG>

When the output torque of the engine E is caused to decrease by the sweep-down control, in response to the decrease in the output torque of the engine E, the torque (first engagement device slip torque in the example shown in FIG. 4) transmitted from the engine E side to the rotary electric machine MG decreases. Thereby, the rotational speed of the rotary electric machine MG tries to lower. Against such effect, in order to maintain the rotational speed of the rotary electric machine MG at the target rotational speed, the output torque of the rotary electric machine MG is caused to increase along with the decrease in the output torque of the engine E. In such event, the amount of increase in the output torque of the rotary electric machine MG corresponds to the amount of decrease in the output torque of the engine E. In addition, the output torque of the engine E "gradually" decreases. Therefore, it is possible to cause the output torque of the rotary electric machine MG to increase, while suppressing the occurrence of follow-up delay with respect to the decrease in the output torque of the engine E. Specifically, because of the rotational speed control for the rotary electric machine MG, the output torque of the rotary electric machine MG increases along with the decrease in the output torque of the engine E due to the sweep-down control for the engine E. In a case in which drag torque that is described later does not occur, the output torque of the rotary electric machine MG increases up to the transmission torque (slip torque of the second engagement device CL2) transmitted from the rotary electric machine MG to the wheels W side through the second engagement device CL2 that is controlled so as to be in the slip engaged state.

Thereby, at the end of the sweep-down control, it is possible that the output torque of the rotary electric machine MG increases by an amount of the output torque that the engine E outputted before starting the sweep-down control. Therefore, before stopping the combustion of the engine E, the transition of the driving force source from the engine E to the rotary electric machine MG can be smoothly performed.

In addition, along with the decrease in the output torque of the engine E, the engagement pressure of the first engagement device CL1 is caused to decrease. In the present embodiment, the first target torque capacity (engagement pressure) of the first engagement device CL1 is caused to decrease to zero. Therefore, it is possible to cause the first engagement device CL1 to transition to the disengaged state at the end of the sweep-down control.

The first engagement device CL1 according to the present embodiment is an engagement device in which the engagement members of the first engagement device CL1 contact with each other even in a state in which the first target torque capacity that is a request value of the engagement pressure of the first engagement device CL1 is zero; therefore, transmission torque capacity is generated due to the contact (drag). Thus, as shown in FIG. 4, the transmission torque capacity due to drag between engagement members is generated in the first engagement device CL1 even after the first target torque capacity of the first engagement device CL1 decreases to zero.

Figure 8:
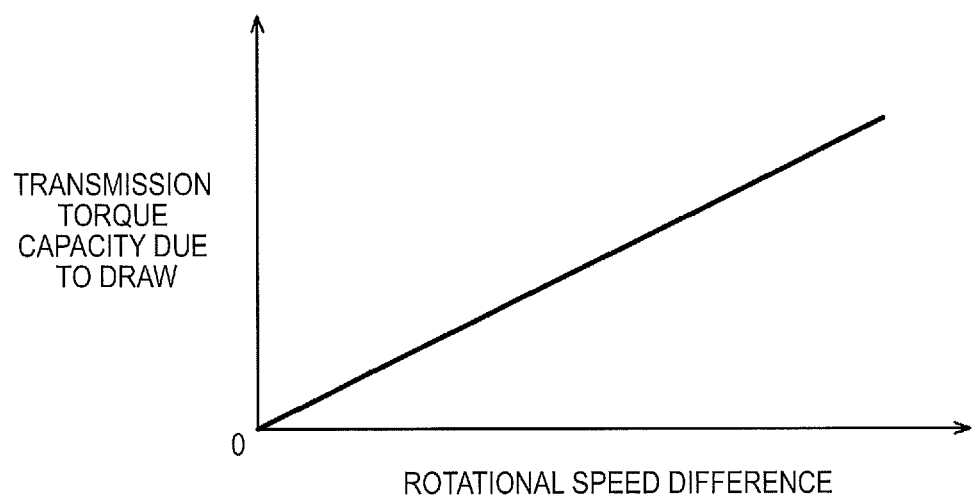
FIG. 8 is a characteristic chart illustrating drag torque according to the embodiment of the present invention.

In addition, the first engagement device CL1 according to the present embodiment is an engagement device in which the transmission torque capacity due to drag changes in accordance with the rotational speed difference $\Delta W1$ between the engagement members thereof, as shown in FIG. 8. In the example shown in FIG. 8, the transmission torque capacity due to drag increases as the rotational speed difference $\Delta W1$ (absolute value) of the first engagement device CL1 increases.

Therefore, as shown in FIG. 4, in a case in which the first target torque capacity of the first engagement device CL1 is zero, the transmission torque capacity due to drag changes in accordance with the rotational speed difference $\Delta W1$ of the first engagement device CL1.

Thus, after the first target torque capacity of the first engagement device CL1 decreases to zero (subsequent to time t02), the slip torque of the first engagement device CL1 does not become zero, but the slip torque of the magnitude of the transmission torque capacity due to drag is transmitted from the engagement member whose rotational speed is higher to the engagement device whose rotational speed is lower.

<Determination of Whether the First Engagement Device CL1 has been Brought into the Disengaged State (Step #06)>

After starting the sweep-down control for the first engagement device CL1 (subsequent to time t01), the engine stop control section 46 starts determination process that determines whether the first engagement device CL1 has been brought into the disengaged state (Step #06).

With respect to the decrease in the first target torque capacity of the first engagement device CL1, an actual transmission torque capacity changes with a response lag. Therefore, an error may occur in a case in which whether the first engagement device CL1 has been brought into the disengaged state is determined based on the decrease in the first target torque capacity.

As described above, the output torque of the rotary electric machine MG increases in accordance with the decrease in actual transmission torque capacity (slip torque of the first engagement device CL1) of the first engagement device CL1 due to the rotational speed control. Therefore, based on the output torque of the rotary electric machine MG, a change in actual transmission torque capacity of the first engagement device CL1 can be monitored.

In the present embodiment, in a case in which the output torque (rotary electric machine required torque) of the rotary electric machine MG achieves the disengagement determination torque, the engine stop control section 46 is configured to determine that the first engagement device CL1 has been bought into the disengaged state.

The first engagement device CL1 according to the present embodiment is an engagement device in which the transmission torque capacity due to drag is generated, and even in a case in which the first engagement device CL1 is brought into the disengaged state, the transmission torque capacity due to drag is generated. Therefore, in case of monitoring an actual transmission torque capacity using the output torque of the rotary electric machine MG, it is necessary to consider the transmission torque capacity due to drag. Specifically, in a case in which the first engagement device CL1 is brought into the disengaged state, an actual transmission torque capacity does not decrease down to zero, but decreases down to the transmission torque capacity due to drag. Thus, the output torque of the rotary electric machine MG increases to torque that is by the transmission torque capacity due to drag (drag torque) lower than the transmission torque that is transmitted from the rotary electric machine MG to the wheels W side through the second engagement device CL2.

In the present embodiment, the engine stop control section 46 is configured to estimate the drag torque that is transmission torque that is transmitted through the first engagement device CL1 in a state in which the request value of the engagement pressure of the first engagement device CL1 is zero.

The engine stop control section 46 is configured to set a disengagement determination torque in accordance with the torque acquired by subtracting the drag torque of the first engagement device CL1 from the transmission torque (slip torque of the second engagement device CL2) that is transmitted from the rotary electric machine MG to the wheels W side through the second engagement device CL2 that is controlled so as to be in the slip engaged state. In the present embodiment, the engine stop control section 46 is configured to set as the disengagement determination torque a value acquired by subtracting the drag torque from the second target torque capacity (may be the vehicle required torque in the present example). Alternatively, the engine stop control section 46 may be configured to set as the disengagement determination torque a value acquired by further subtracting a predetermined value from a value acquired by subtracting the drag torque from the second target torque capacity.

In addition, the first engagement device CL1 according to the present embodiment is an engagement device in which the transmission torque capacity due to drag changes in accordance with the rotational speed difference $\Delta W1$ between engagement members thereof. Therefore, the engine stop control section 46 is configured to estimate drag torque based on the rotational speed difference $\Delta W1$ of the engagement members of the first engagement device CL1. In the present embodiment, the engine stop control section 46 stores relation characteristics between the rotational speed difference $\Delta W1$ between engagement members of the first engagement device CL1 and the transmission torque capacity due to drag, as shown in FIG. 8, and is configured to estimate the transmission torque capacity due to drag based on the rotational speed difference $\Delta W1$ of the first engagement device CL1 using such relation characteristics. The engine stop control section 46 is configured to determine the direction (positive/negative) of the torque transmission based on high-low relation between the rotational speed of the engine E and the rotational speed of the rotary electric machine MG, and estimate the drag torque based on the estimated transmission torque capacity due to drag. Specifically, the engine stop control section 46, in a case in which the rotational speed of the engine E is higher than the rotational speed of the rotary electric machine MG, sets a value (positive value) of the transmission torque capacity due to drag as the drag torque, and in a case in which the rotational speed of the engine E is lower than the rotational speed of the rotary electric machine MG, sets a value acquired by multiplying a value (positive value) of the transmission torque capacity due to drag by −1 as the drag torque. In addition, the engine stop control section 46, in a case in which the rotational speed of the engine E is equal to the rotational speed of the rotary electric machine MG, sets zero as the drag torque.

Along with the decrease in the output torque of the engine E, the output torque of the rotary electric machine MG increases. When the output torque of the rotary electric machine MG (rotary electric machine required torque) achieves the disengagement determination torque, it is determined that the first engagement device CL1 has been brought into the disengaged state (time t02).

<Combustion Stop of Engine E (Step #07)>

In the example of FIG. 4, in a case in which the engine stop control section 46 determines that the first engagement device CL1 has been brought into the disengaged state, the engine stop control section 46 stops the combustion of the engine E (FIG. 3, Step #07; time t02).

Positive torque component due to combustion disappears because of the stop of the combustion, and the output torque of the engine E decreases from zero to negative torque due to friction torque, etc. The rotational speed of the engine E starts to decrease due to the negative torque due to friction torque, etc. Because the first engagement device CL1 is in the disengaged state, the rotational speed of the engine E naturally decreases due to the stop of the combustion as if free fall. Therefore, it is possible to cause the rotational speed of the engine E to decrease without giving a driver an uncomfortable feeling.

<Step #08, Step #09>

In addition, after determining that the first engagement device CL1 has been brought into the disengaged state and stopping the combustion of the engine E, in a case in which the engine stop control section 46 determines that the rotational speed of the engine E achieves the direct engagement start speed that is set in accordance with the synchronous rotational speed (FIG. 3, Step #08: Yes), the engine stop control section 46 starts transition control that causes the second engagement device CL2 to transition from the slip engaged state to the direct engaged state (FIG. 3, Step #09; time t04).

In the present embodiment, the engine stop control section 46 is configured to set a value of the synchronous rotational speed as the direct engagement start speed. In the example shown in FIG. 4, the direct engagement start speed is set to zero because the synchronous rotational speed is zero.

The direct engagement start speed that is compared with the rotational speed of the engine E is set in accordance with the synchronous rotational speed. Therefore, it is possible to cause the rotational speed of the engine E when the second engagement device CL2 transitions to the direct engaged state (time t05) to approach the synchronous rotational speed. In addition, it is possible to cause the rotational speed difference ΔW1 of the first engagement device CL1 to approach to zero. The rotational speed difference ΔW1 of the first engagement device CL1 is close to zero. Therefore, it is possible to cause the drag torque to approach to zero. Thus, when the second engagement device CL2 transitions to the direct engaged state, it is possible to suppress the drag torque being transmitted to the wheels W thereby causing a torque shock.

In the present embodiment, the engine stop control section 46 is configured to execute rotational speed control for decreasing rotational difference that causes the target rotational speed of the rotary electric machine MG to gradually decrease down to the synchronous rotational speed (time t04 to time t05).

During the rotational speed control for decreasing rotational difference, the output torque of the rotary electric machine MG decreases by the amount of inertia torque to cause the rotational speed of the rotary electric machine MG to decrease (time t04 to time t05). Note that the inertia torque is a value acquired by multiplying the rotational acceleration of the rotary electric machine MG by the inertia moment of the rotating member that rotates together with the rotary electric machine MG.

When the engine stop control section 46 determines that the rotational speed of the rotary electric machine MG approaches the synchronous rotational speed (time t05), the engine stop control section 46 starts the sweep-up that causes the second target torque capacity (engagement pressure) of the second engagement device CL2 to gradually increase up to the full engagement capacity (full engagement pressure). The full engagement capacity (full engagement pressure) here corresponds to the transmission torque capacity (engagement pressure) with which an engagement state without slip can be maintained even if the torque transmitted from the driving force source to the engagement device fluctuates.

In addition, after causing the second engagement device CL2 to transition to the direct engaged state, the engine stop control section 46 terminates the rotational speed control for the rotary electric machine MG and starts torque control for the rotary electric machine MG (time t05). In the torque control, a value of the vehicle required torque is set as the rotary electric machine required torque.

When the second target torque capacity (engagement pressure) of the second engagement device CL2 increases up to the full engagement capacity, the engine stop control section 46 terminates the engine start control (time t06).

3-4-1-2-2. Second Example (in a Case in which the Second Engagement Device CL2 is in the Direct Engaged State (No. 1))

Subsequently, the second example of the engine stop control is explained with reference to the timing chart shown in FIG. 5. The second example exemplifies a case in which the second engagement device CL2 is in the direct engaged state before starting the engine stop control.

<Initial State Before Starting the Engine Stop Control>

In an initial state before starting the engine stop control (up to time t11), the operation mode is set to the parallel mode to cause the engine E to rotate for combustion, in the same manner as the first example. In addition, the vehicle control unit 34 sets positive torque as the vehicle required torque and, using the driving force of the engine E, drives the vehicle and causes the rotary electric machine MG to generate electric power, in the same manner as the first example.

Figure 5:
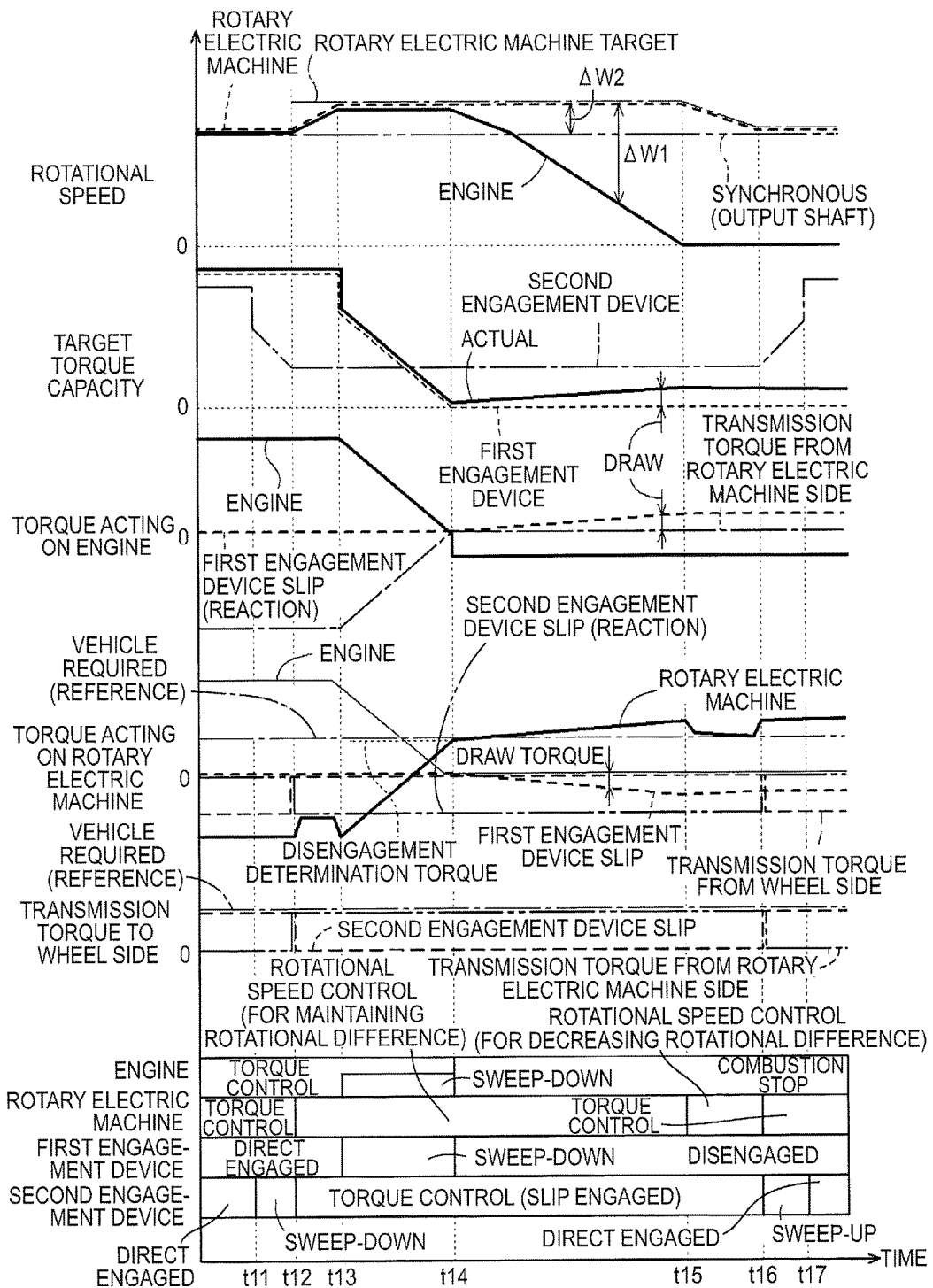
FIG. 5 is a timing chart illustrating a second example of the processing of the operation stop of the internal combustion engine according to the embodiment of the present invention.

In the example shown in FIG. 5, the vehicle speed (rotational speed of the output shaft O) is relatively high and the second engagement device CL2 is controlled so as to be in the direct engaged state. In addition, the first engagement device CL1 is also controlled so as to be in the direct engaged state. The rotational speed of the engine E is greater than or equal to a rotational speed at which the engine E can continue self-sustained operation in a state in which both the first engagement device CL1 and the second engagement device CL2 are controlled so as to be in the direct engaged state.

In the example shown in FIG. 5, the vehicle control unit 34 performs torque control for the engine E and torque control for the rotary electric machine MG. The vehicle control unit 34 sets a target electric power generation torque (negative torque) as the rotary electric machine required torque and sets a value acquired by subtracting the rotary electric machine required torque from the vehicle required torque as the engine required torque such that the total of the engine required torque and the rotary electric machine required torque coincide with the vehicle required torque.

<Start of Engine Stop Control (Step #01)>

Also, in the example shown in FIG. 5, in a case in which the amount of electric power stored in the battery becomes greater than or equal to the charge limit determination value, the vehicle control unit 34 changes the operation mode from the parallel mode to the electric power mode and determines an operation stop of the engine E (time t11). In a case in which the operation stop of the engine E is determined in a state in which positive torque is transmitted from the rotary electric machine MG side to the wheels W side (FIG. 3, Step #01: Yes), the engine stop control section 46 starts a series of engine stop control (time t11).

<Start of Control that Brings the Second Engagement Device CL2 into the Slip Engaged State (Step #02)>

In a case in which the engine stop control section 46 determines an operation stop of the engine E, the engine stop control section 46 starts control that brings the second engagement device CL2 into the slip engaged state (FIG. 3, Step #02; time t11).

In the example shown in FIG. 5, the second engagement device CL2 is in the direct engaged state. Therefore, the engine stop control section 46 starts transition control that causes the second engagement device CL2 to transition from the direct engaged state to the slip engaged state (time t11). In the present embodiment, the engine stop control section 46 executes sweep-down that causes the second target torque capacity (engagement pressure) of the second engagement device CL2 to gradually decrease from the full engagement capacity (full engagement pressure) as the transition control (time t11 to time t12).

In a case in which the engine stop control section 46 determines that the second engagement device CL2 has been brought into the slip engaged state, the engine stop control section 46 terminates the sweep-down and starts torque control that sets a value of the vehicle required torque as the second target torque capacity (engagement pressure) of the second engagement device CL2 (time t12). The engine stop control section 46 is configured to determine that the second engagement device CL2 has been brought into the slip engaged state in a case in which a rotational speed difference ΔW2 (absolute value) between the rotational speed of the rotary electric machine MG and the synchronous rotational speed becomes greater than or equal to a predetermined determination speed difference. The rotational speed difference ΔW2 corresponds to the rotational speed difference between the engagement members of the second engagement device CL2.

<Start of Rotational Speed Control (Maintaining Rotational Difference) of the Rotary Electric Machine MG (Step #03)>

After the second engagement device CL2 is brought into the slip engaged state, the engine stop control section 46 starts execution of the rotational speed control for the rotary electric machine MG (FIG. 3, Step #03; time t12).

In the example shown in FIG. 5, the engine stop control section 46 terminates the torque control and starts the rotational speed control for maintaining rotational difference (time t12).

<Start of Sweep-Down Control of Engine Output Torque (Step #04)>

After the second engagement device CL2 is brought into the slip engaged state, the engine stop control section 46 starts execution of the sweep-down control for the engine E that causes the output torque of the engine E to decrease down to a predetermined torque decrease value (FIG. 3, Step #04; time t12), in the same manner as the example shown in FIG. 4.

<Start of Sweep-Down Control of Engagement Pressure of the First Engagement Device CL1 (Step #05)>

The engine stop control section 46 starts sweep-down control for the first engagement device CL1 that causes the engagement pressure of the first engagement device CL1 to decrease in accordance with the decrease in the output torque of the engine E due to the sweep-down control for the engine E (FIG. 3, Step #05; time t12).

In the example shown in FIG. 5, the engagement pressure of the first engagement device CL1 decreases in accordance with the decrease in the output torque of the engine E due to the feedforward control.

After causing the first target torque capacity of the first engagement device CL1 to decrease in a stepped manner from the full engagement capacity (full engagement pressure) to the value of the engine required torque just before starting the sweep-down control, the engine stop control section 46 executes the feedforward control that causes the first target torque capacity of the first engagement device CL1 to decrease from the value of the engine required torque to zero at the same rate of change as that of the engine required torque (time t13 to time t14).

<Increase in Output Torque of the Rotary Electric Machine MG>

When the output torque of the engine E decreases due to the sweep-down control, the torque transmitted from the engine E side to the rotary electric machine MG decreases in accordance with the decrease in the output torque of the engine E ("transmission torque from rotary electric machine MG side" in the example shown in FIG. 5). Thereby, the rotational speed of the rotary electric machine MG tries to lower. Against such effect, in order to maintain the rotational speed of the rotary electric machine MG at the target rotational speed, the output torque of the rotary electric machine MG is caused to increase along with the decrease in the output torque of the engine E, in the same manner as the case shown in FIG. 4. Therefore, at the end of the sweep-down control, it is possible that the output torque of the rotary electric machine MG increases by the amount of the output torque that the engine E outputted before starting the sweep-down control.

In addition, the engagement pressure of the first engagement device CL1 decreases in accordance with the decrease in the output torque of the engine E. Therefore, it is possible to cause the first engagement device CL1 to transition to the disengaged state. In the example shown in FIG. 5, a case in which the first engagement device CL1 is in the direct engaged state during execution of the sweep-down control for the first engagement device CL1 (time t13 to time t14) is indicated. However, there is also a case in which the first engagement device CL1 transitions to the slip engaged state because some rotational speed difference ΔW1 is generated during execution of the sweep-down control for the first engagement device CL1.

In the example shown in FIG. 5, when the first target torque capacity of the first engagement device CL1 has decreased down to zero (time t14), the drag torque is zero because the rotational speed difference ΔW1 between the engagement members of the first engagement device CL1 is zero.

<Determination of Whether the First Engagement Device CL1 has been Brought into the Disengaged State (Step #06)>

After starting the sweep-down control for the first engagement device CL1 (subsequent to time t13), the engine stop control section 46 starts determination process that determines whether the first engagement device CL1 has been brought into the disengaged state (Step #06).

Also, in the case shown in FIG. 5, the engine stop control section 46 is configured to determine that the first engagement device CL1 has been brought into the disengaged state in a case in which the output torque of the rotary electric machine MG achieves the disengagement determination torque.

In the example shown in FIG. 5, the drag torque is estimated to be zero because the rotational speed difference ΔW1 between the engagement members of the first engagement device CL1 is zero. Therefore, the disengagement determination torque is set to the second target torque capacity (vehicle required torque).

Along with the decrease in the output torque of the engine E, the output torque of the rotary electric machine MG increases. When the output torque of the rotary electric machine MG (rotary electric machine required torque) achieves the disengagement determination torque, it is determined that the first engagement device CL1 has been brought into the disengaged state (time t14).

<Combustion Stop of Engine E (Step #07)>

In the same manner as the example shown in FIG. 4, in a case in which the engine stop control section 46 determines that the first engagement device CL1 has been brought into the disengaged state, the engine stop control section 46 stops the combustion of the engine E (FIG. 3, Step #07; time t14). After the combustion stop of the engine E, the rotational speed of the engine E naturally decreases as if free fall because the first engagement device CL1 is in the disengaged state (time t14 to time t15).

Along with the decrease in the rotational speed of the engine E, the rotational speed difference ΔW1 between the engagement members of the first engagement device CL1 increases from zero (subsequent to time t14). Along with the increase in the rotational speed difference ΔW1 of the first engagement device CL1, the transmission torque capacity due to drag of the first engagement device CL1 increases and the drag torque acting on the rotary electric machine MG decreases from zero.

When the drag torque decreases from zero, the rotational speed of the rotary electric machine MG tries to decrease. Against such effect, in order to maintain the rotational speed of the rotary electric machine MG at the target rotational speed, the output torque of the rotary electric machine MG is caused to increase by the amount of decrease in the drag torque with respect to the slip torque of the second engagement device CL2 (time t14 to time t15).

<Step #08, Step #09>

After determining that the first engagement device CL1 has been brought into the disengaged state and stopping the combustion of the engine E, in a case in which the engine stop control section 46 determines that the rotational speed of the engine E has achieved the direct engagement start speed (FIG. 3, Step #08: Yes), the engine stop control section 46 starts transition control that causes the second engagement device CL2 to transition from the slip engaged state to the direct engaged state (FIG. 3, Step #09; time t15). In the example shown in FIG. 5, the direct engagement start speed is set to zero.

In the same manner as the example shown in FIG. 4, the engine stop control section 46 is configured to execute, as the transition control to the direct engaged state, the rotational speed control for decreasing rotational difference that causes the target rotational speed of the rotary electric machine MG to gradually decrease down to the synchronous rotational speed (time t15 to time t16).

During the rotational speed control for decreasing rotational difference, the output torque of the rotary electric machine MG decreases by the amount of inertia torque to cause the rotational speed of the rotary electric machine MG to decrease (time t15 to time t16).

The engine stop control section 46 is configured to cause the rate of change of the target rotational speed of the rotary electric machine MG to approach the rate of change of the synchronous rotational speed as the target rotational speed of the rotary electric machine MG approaches the synchronous rotational speed. Therefore, when the target rotational speed of the rotary electric machine MG approaches the synchronous rotational speed (time t16), the inertia torque (absolute value) decreases and the output torque of the rotary electric machine MG approaches the torque that is increased by the decreased amount of the drag torque with respect to the slip torque of the second engagement device CL2. Specifically, when the rotational speed difference ΔW2 of the second engagement device CL2 decreases down to zero and the second engagement device CL2 transitions to the direct engaged state (time t16), the output torque of the rotary electric machine MG is caused to increase so as to cancel the drag torque to compensate the drag torque.

Therefore, even in a case in which the drag torque is generated as illustrated in the example shown in FIG. 5, when the second engagement device CL2 is brought into the direct engaged state, the drag torque is cancelled by the output torque of the rotary electric machine MG. Thereby, it is possible to suppress the drag torque being transmitted to the wheels W thereby causing a torque shock.

In addition, when the engine stop control section 46 determines that the rotational speed of the rotary electric machine MG has approached the synchronous rotational speed (time t16), the engine stop control section 46 starts the sweep-up that causes the second target torque capacity (engagement pressure) of the second engagement device CL2 to gradually increase up to the full engagement capacity (full engagement pressure), in the same manner as the example shown in FIG. 4.

In addition, after the engine stop control section 46 causes the second engagement device CL2 to transition to the direct engaged state, the engine stop control section 46 terminates the rotational speed control for the rotary electric machine MG and starts the torque control for the rotary electric machine MG (time t16). In the torque control, the value of the vehicle required torque is set as the rotary electric machine required torque.

When the second target torque capacity (engagement pressure) of the second engagement device CL2 increases up to the full engagement capacity, the engine stop control section 46 terminates the engine start control (time t17).

3-4-1-2-3. Third Example (in a Case in which the Second Engagement Device CL2 is in the Direct Engaged State (No. 2))

Subsequently, the third example of the engine stop control is explained with reference to the timing chart shown in FIG.

Figure 6:
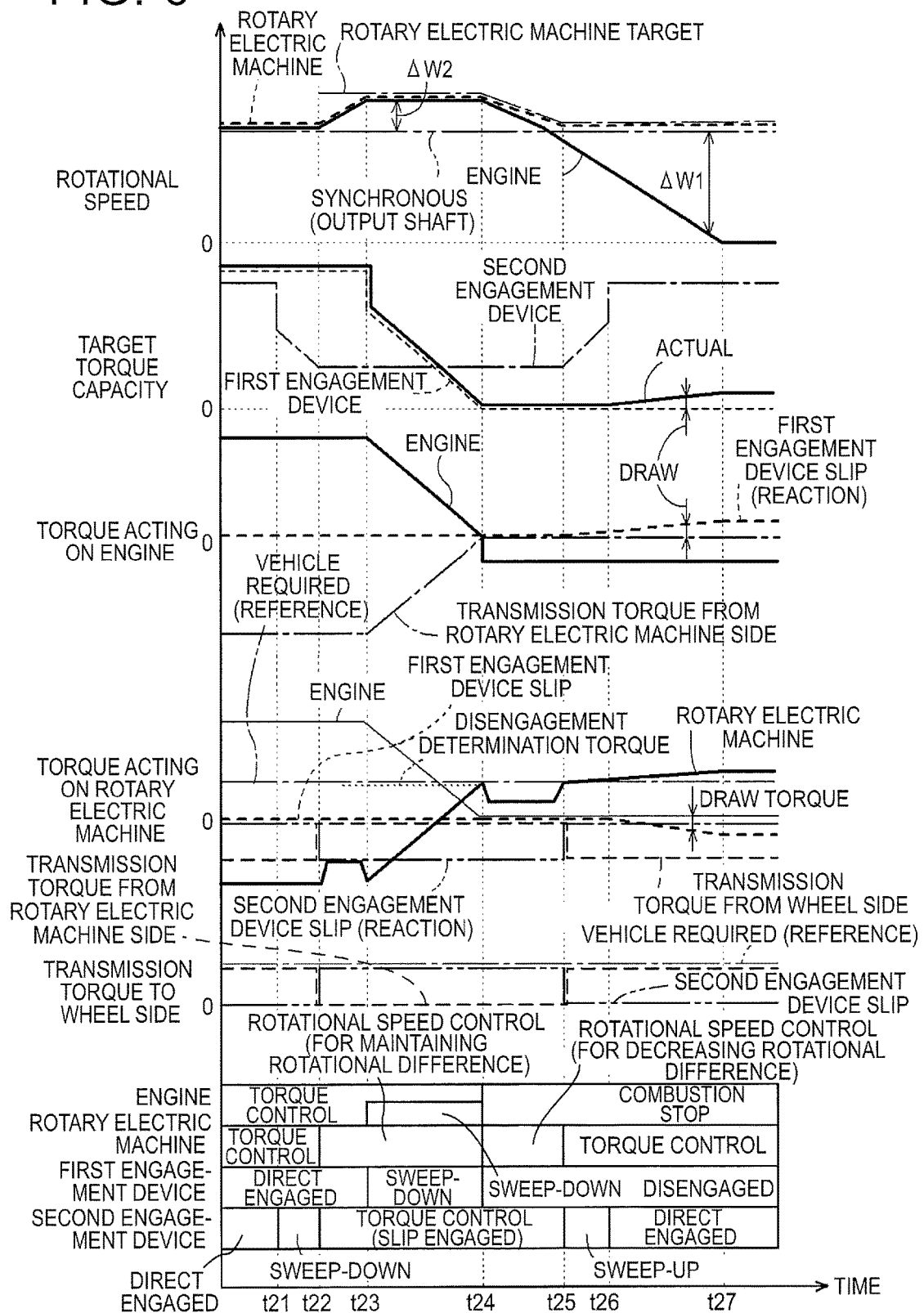
FIG. 6 is a timing chart illustrating a third example of the processing of the operation stop of the internal combustion engine according to the embodiment of the present invention.

6. The third example exemplifies a case in which the second engagement device CL2 is in the direct engaged state before starting the engine stop control, in the same manner as the second example. However, the timing at which the second engagement device CL2 is caused to transition to the direct engaged state in the third example is different from the timing in the second example. The section up to time t24 in the example shown in FIG. 6 is the same as the section up to time t14 in the example shown in FIG. 5. Therefore, the explanation is not given.

<Combustion Stop of Engine E (Step #07)>

In the same manner as the example shown in FIG. 5, in a case in which the engine stop control section 46 determines that the first engagement device CL1 has been brought into the disengaged state, the engine stop control section 46 stops the combustion of the engine E (time t24). After the combustion of the engine E stops, the rotational speed of the engine E naturally decreases as if free fall because the first engagement device CL1 is in the disengaged state (time t24 to time t27).

<Step #08, Step #09>

In the example shown in FIG. 6, in a case in which the engine stop control section 46 determines that the first engagement device CL1 has been brought into the disengaged state, the engine stop control section 46 starts the transition control that causes the second engagement device CL2 to transition from the slip engaged state to the direct engaged state at the same time as the combustion stop of the engine E (time t24).

In the same manner as the example shown in FIG. 5, in a case in which the engine stop control section 46 is configured to execute, as the transition control to the direct engaged state, the rotational speed control for decreasing rotational difference that causes the target rotational speed of the rotary electric machine MG to gradually decrease down to the synchronous rotational speed (time t24 to time t26).

After the combustion of the engine E stops, it is possible to cause the rotational speed of the rotary electric machine MG to decrease in accordance with the decreasing rotational speed of the engine E. Thereby, it is possible to suppress an increase in the rotational speed difference ΔW1 of the first engagement device CL1 also after the rotational speed of the engine E starts to decrease (time t24 to time t25).

Thereby, before the rotational speed difference ΔW2 between the engagement members of the second engagement device CL2 decreases down to zero and the second engagement device CL2 transitions to the direct engaged state (time t25), it is possible to suppress an increase in the rotational speed difference ΔW1 of the first engagement device CL1, thereby it is possible to maintain the drag torque to be approximately zero. Therefore, when the second engagement device CL2 transitions to the direct engaged state, it is possible to suppress the drag torque being transmitted to the wheels W thereby causing a torque shock.

When the engine stop control section 46 determines that the rotational speed of the rotary electric machine MG has approached the synchronous rotational speed (time t25), the engine stop control section 46 starts the sweep-up that causes the second target torque capacity (engagement pressure) of the second engagement device CL2 to gradually increase up to the full engagement capacity (full engagement pressure), in the same manner as the example shown in FIG. 5.

In addition, after the engine stop control section 46 causes the second engagement device CL2 to transition to the direct engaged state, the engine stop control section 46 terminates the rotational speed control for the rotary electric machine MG and starts the torque control for the rotary electric machine MG (time t25). In the torque control, the value of the vehicle required torque is set as the rotary electric machine required torque.

When the second target torque capacity (engagement pressure) of the second engagement device CL2 increases up to the full engagement capacity, the engine stop control section 46 terminates the engine start control (time t25).

3-4-1-2-4. Fourth Example (in a Case in which the Second Engagement Device CL2 is in the Slip Engaged State (No. 2))

Subsequently, the fourth example of the engine stop control is explained with reference to the timing chart shown in FIG. 7. The fourth example exemplifies a case in which the second engagement device CL2 is in the slip engaged state before starting the engine stop control, in the same manner as the first example. However, the timing at which the second engagement device CL2 transitions to the direct engaged state in the fourth example is different from the timing in the first example.

Figure 7:
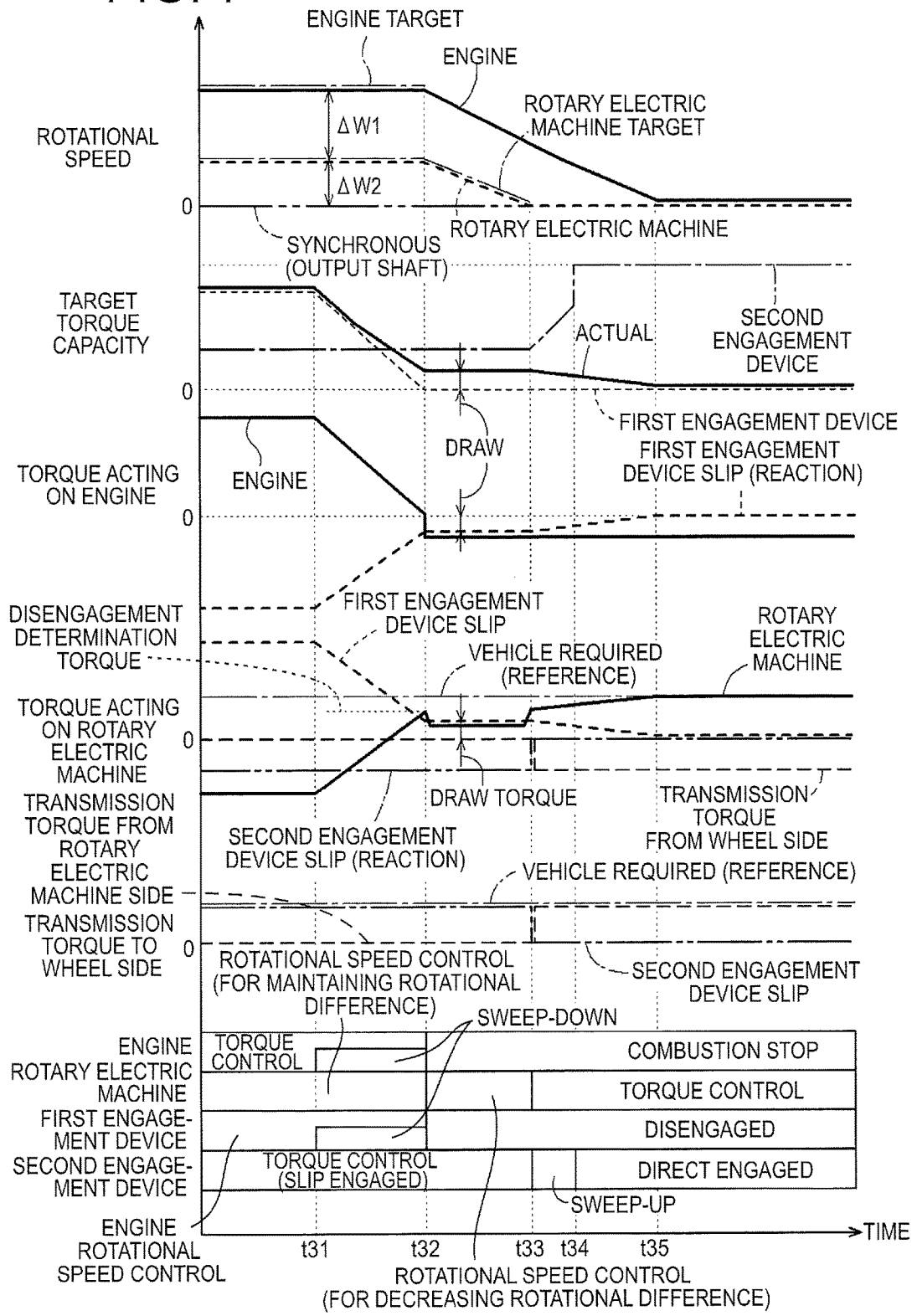
FIG. 7 is a timing chart illustrating a forth example of the processing of the operation stop of the internal combustion engine according to the embodiment of the present invention.

The section up to time t32 in the example shown in FIG. 7 is the same as the section up to time t02 in the example shown in FIG. 4. Therefore, the explanation is not given.

<Combustion Stop of Engine E (Step #07)>

In the same manner as the example shown in FIG. 4, in a case in which the engine stop control section 46 determines that the first engagement device CL1 has been brought into the disengaged state, the engine stop control section 46 stops the combustion of the engine E (time t32). After the combustion of the engine E stops, the rotational speed of the engine E naturally decreases as if free fall because the first engagement device CL1 is in the disengaged state (time t32 to time t35).

<Step #08, Step #09>

In the example shown in FIG. 7, in a case in which the engine stop control section 46 determines that the first engagement device CL1 has been brought into the disengaged state, the engine stop control section 46 starts the transition control that causes the second engagement device CL2 to transition from the slip engaged state to the direct engaged state at the same timing as the combustion stop of the engine E (time t32), in the same manner as the example shown in FIG. 6.

The engine stop control section 46 is configured to execute, as the transition control to the direct engaged state, the rotational speed control for decreasing rotational difference that causes the target rotational speed of the rotary electric machine MG to gradually decrease down to the synchronous rotational speed (time t32 to time t33).

As the rotational speed of the engine E decreases, the rotational speed of the rotary electric machine MG decreases. Therefore, the decrease in the rotational speed difference ΔW1 of the first engagement device CL1 is suppressed (time t32 to time t33). Thus, a state in which transmission torque capacity due to drag in the first engagement device CL1 is generated is maintained, and a state in which the drag torque acting on the rotary electric machine MG is greater than zero is maintained (time t32 to time t33).

As explained with the example shown in FIG. 5, the engine stop control section 46 is configured to cause the rate of change of the target rotational speed of the rotary electric machine MG to approach the rate of change of the synchronous rotational speed as the target rotational speed of the rotary electric machine MG approaches the synchronous rotational speed.

Thus, when the target rotational speed of the rotary electric machine MG approaches the synchronous rotational speed (time t33), the inertia torque (absolute value) decreases and the output torque of the rotary electric machine MG approaches the torque that is subtracted by the amount of the drag torque with respect to the slip torque of the second engagement device CL2. That is, when the rotational speed difference $\Delta W2$ of the second engagement device CL2 decreases down to zero and the second engagement device CL2 transitions to the direct engaged state (time t33), the output torque of the rotary electric machine MG becomes the torque that cancels the drag torque so as to compensate the drag torque.

Therefore, in the same manner as the example shown in FIG. 5, even in a case in which the drag torque is generated, when the second engagement device CL2 is brought into the direct engaged state, the drag torque is cancelled by the output torque of the rotary electric machine MG. Thereby, it is possible to suppress the drag torque being transmitted to the wheels W thereby causing a torque shock.

In addition, when the engine stop control section 46 determines that the rotational speed of the rotary electric machine MG has approached the synchronous rotational speed (time t33), the engine stop control section 46 starts the sweep-up that causes the second target torque capacity (engagement pressure) of the second engagement device CL2 to gradually increase up to the full engagement capacity (full engagement pressure), in the same manner as the example shown in FIG. 4.

In addition, after the engine stop control section 46 causes the second engagement device CL2 to transition to the direct engaged state, the engine stop control section 46 terminates the rotational speed control for the rotary electric machine MG and starts the torque control for the rotary electric machine MG (time t33). In the torque control, the value of the vehicle required torque is set as the rotary electric machine required torque.

When the second target torque capacity (engagement pressure) of the second engagement device CL2 increases up to the full engagement capacity, the engine stop control section 46 terminates the engine start control (time t33).

Other Embodiments

Lastly, other embodiments of the present invention are explained. A configuration disclosed in each of the embodiments described below is not limited to be applied separately. The configuration may be applied in combination with a configuration disclosed in any other embodiment unless any contradiction occurs.

Figure 9:
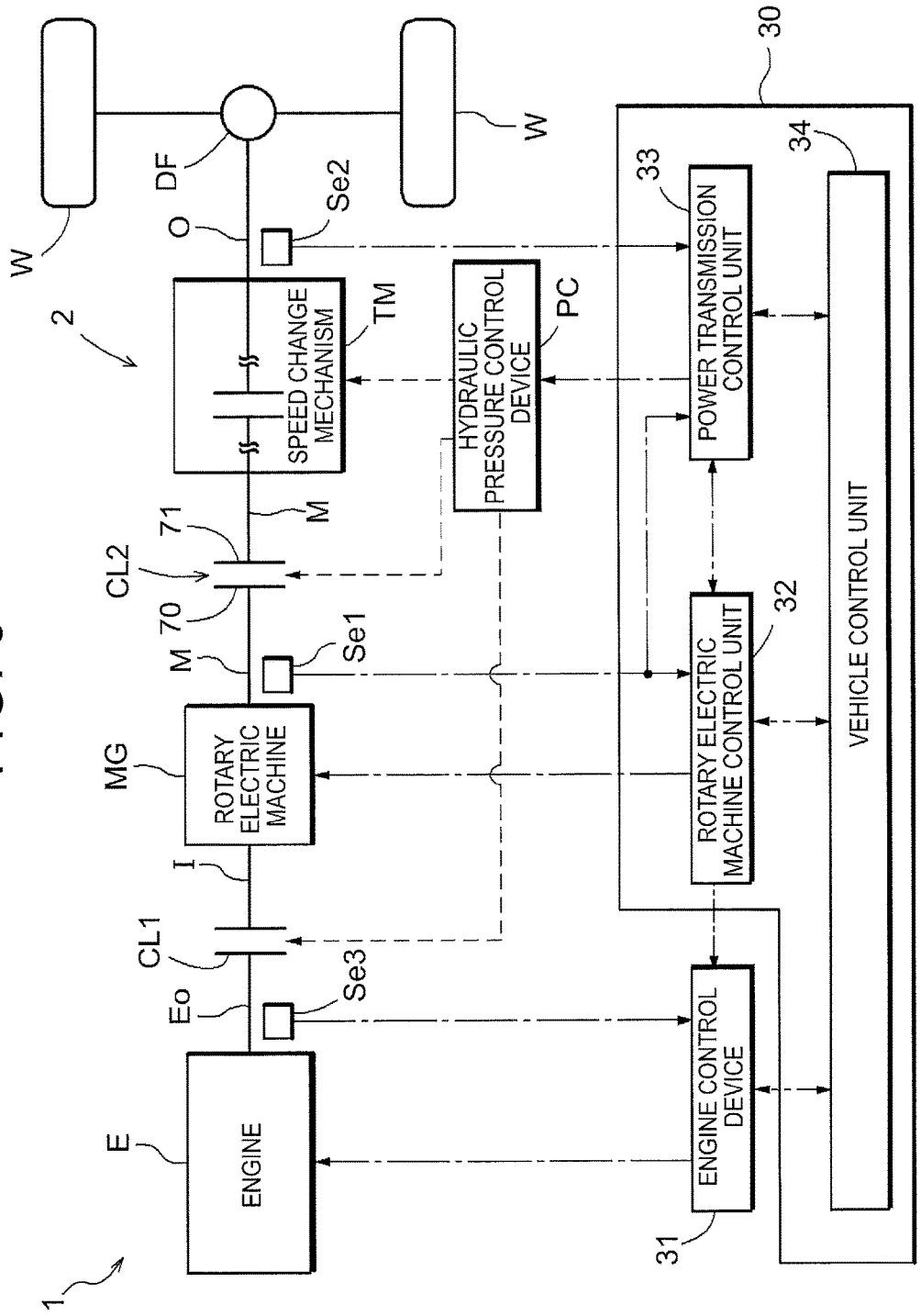
FIG. 9 is a schematic diagram showing a schematic configuration of a vehicle drive device and a control device according to another embodiment of the present invention.

(1) In the present embodiment described above, a case is exemplified, in which one of a plurality of engagement devices of the speed change mechanism TM is set as the second engagement device CL2 whose engagement state is controlled during the start control of the engine E. However, embodiments of the present invention are not limited thereto. As shown in FIG. 9, the vehicle drive device 1 may include a further engagement device between the rotary electric machine MG and the speed change mechanism TM on the power transmission path 2, and may be configured such that the engagement device is set as the second engagement device CL2 whose engagement state is controlled during the start control of the engine E. Alternatively, the speed change mechanism TM may not be provided in the vehicle drive device 1 shown in FIG. 9.

Figure 10:
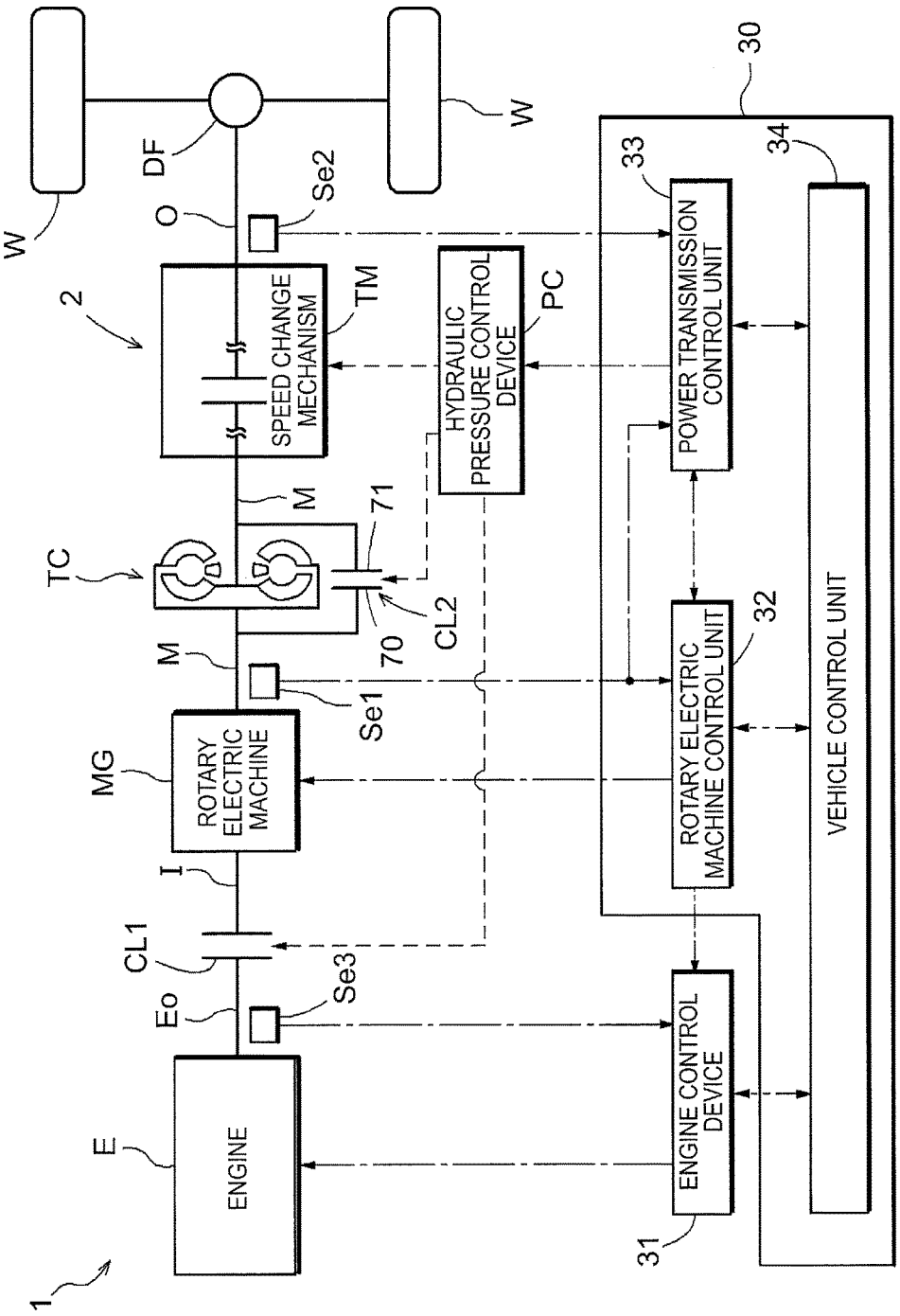
FIG. 10 is a schematic diagram showing a schematic configuration of a vehicle drive device and a control device according to a further embodiment of the present invention.

Alternatively, as shown in FIG. 10, the vehicle drive device 1 further include a torque converter TC between the rotary electric machine MG and the speed change mechanism TM on the power transmission path, and may be configured such that a lockup clutch that realizes the direct engaged state between the input output members of the torque converter TC is set as the second engagement device CL2 whose engagement state is controlled during the start control of the engine E.

(2) In the aforementioned embodiment, a case was explained as an example, in which the first engagement device CL1 and the second engagement device CL2 are engagement devices that are controlled with hydraulic pressure. However, embodiments of the present invention are not limited thereto. One or both of the first engagement device CL1 and the second engagement device CL2 may be engagement devices that are controlled with driving force other than hydraulic pressure, for example, electromagnetic driving force, driving force by servomotor, etc.

(3) In the aforementioned embodiment, a case was explained as an example, in which the speed change mechanism TM is an automatic speed change mechanism. However, embodiments of the present invention are not limited thereto. The speed change mechanism TM may be configured to be a speed change mechanism other than the automatic speed change mechanism, such as an automatic continuously variable transmission that is capable of continuously changing the speed ratio. Also, in such a case, an engagement device provided in the speed change mechanism TM may be set as the second engagement device CL2 whose engagement state is controlled during the start control of the engine E. Alternatively, an engagement device installed separately from the speed change mechanism TM may be set as the second engagement device CL2.

(4) In the aforementioned embodiment, a case was explained as an example, in which the control device 30 includes a plurality of control units 32 to 34 and these plurality of control units 32 to 34 include a plurality of control sections 41 to 46. However, embodiments of the present invention are not limited thereto. The control device 30 may include the aforementioned plurality of control units 32 to 34 as control devices which are integrated or separated in any combination. The allocation of the plurality of function sections 41 to 46 to the plurality of control units 32 to 34 can be made as desired. For example, in a case in which the second engagement device CL2 is one of the engagement device of the speed change mechanism TM, the speed change mechanism control section 43 and the second engagement state device control section 45 may be integrated.

(5) In the aforementioned embodiment, a case was explained as an example, in which the engine stop control section 46 is configured to control the second engagement device CL2 so as to be in the slip engaged state in a case in which the engine stop control section 46 determines an operation stop of the engine E. However, embodiments of the present invention are not limited thereto. Specifically, the engine stop control section 46 may be configured not to control the second engagement device CL2 so as to be in the slip engaged state in a case in which the engine stop control section 46 determines an operation stop of the engine E. For example, the engine stop control section 46 may be configured not to control the second engagement device CL2 so as to be in the slip engaged state in a case in which the engine stop control section 46 determines an operation stop of the engine E in a state in which the second engagement device CL2 is in the direct engaged state.

(6) In the aforementioned embodiment, a case was explained as an example, in which the engine stop control section 46 is configured to determine that the first engagement device CL1 has been brought into the disengaged state in a case in which the output torque of the rotary electric machine MG achieves the disengagement determination torque. However, embodiments of the present invention are not limited thereto. Specifically, the engine stop control section 46 may be configured to determine that first engagement device CL1 has been brought into the disengaged state in another method, such as, when the first target torque capacity (engagement pressure) of the first engagement device CL1 has decreased down to zero.

(7) In the aforementioned embodiment, a case was explained as an example, in which the engine stop control section 46 is configured to perform the sweep-down control that causes the engagement pressure of the first engagement device CL1 to decrease in accordance with the decrease in the output torque of the engine E due to the sweep-down control for the engine E. However, embodiments of the present invention are not limited thereto. Specifically, the engine stop control section 46 may be configured to cause the engagement pressure of the first engagement device CL1 to decrease independently from the decrease in the output torque of the engine E due to the sweep-down control for the engine E, for example, by causing the first target torque capacity (engagement pressure) of the first engagement device CL1 to decrease down to zero at a constant rate of change, in a case in which the first engagement device CL1 is in the direct engaged state before starting the engine stop control. Also, in such case, it is possible to cause the torque that is transmitted from the engine E side to the rotary electric machine MG through the first engagement device CL1 that is in the direct engaged state to decrease in accordance with the decrease in the output torque of the engine E.

(8) In the aforementioned embodiment, a case was explained as an example, in which the engine stop control section 46 is configured to cause the output torque of the engine E to gradually decrease as the sweep-down control for the engine E. However, embodiments of the present invention are not limited thereto. Specifically, the engine stop control section 46 is only necessary to be configured to cause the output torque of the engine E to decrease as the sweep-down control (torque down control) for the engine E. For example, the engine stop control section 46 may be configured to cause the output torque (engine required torque) of the engine E to decrease in a stepped manner.

INDUSTRIAL APPLICABILITY

The present invention may be suitably applied to a control device that controls a vehicle drive device in which a first engagement device, a rotary electric machine, and a second engagement device are arranged in this order from an internal combustion engine on a power transmission path that connects the internal combustion engine to wheels.

DESCRIPTION OF THE REFERENCE NUMERALS

ΔW1: ROTATIONAL SPEED DIFFERENCE OF FIRST ENGAGEMENT DEVICE
ΔW2: ROTATIONAL SPEED DIFFERENCE OF SECOND ENGAGEMENT DEVICE
1: VEHICLE DRIVE DEVICE
2: POWER TRANSMISSION PATH
30: CONTROL DEVICE
31: ENGINE CONTROL DEVICE
32: ROTARY ELECTRIC MACHINE CONTROL UNIT
32: CONTROL UNIT
33: POWER TRANSMISSION CONTROL UNIT
34: VEHICLE CONTROL UNIT
41: ENGINE CONTROL SECTION
42: ROTARY ELECTRIC MACHINE CONTROL SECTION
43: SPEED CHANGE MECHANISM CONTROL SECTION
44: FIRST ENGAGEMENT DEVICE CONTROL SECTION
45: SECOND ENGAGEMENT DEVICE CONTROL SECTION
46: ENGINE STOP CONTROL SECTION
CL1: FIRST ENGAGEMENT DEVICE
CL2: SECOND ENGAGEMENT DEVICE
E: ENGINE (INTERNAL COMBUSTION ENGINE)
I: INPUT SHAFT
M: INTERMEDIATE SHAFT
MG: ROTARY ELECTRIC MACHINE
O: OUTPUT SHAFT
PC: HYDRAULIC PRESSURE CONTROL DEVICE
SE1: INPUT ROTATIONAL SPEED SENSOR
SE2: OUTPUT ROTATIONAL SPEED SENSOR
SE3: ENGINE ROTATIONAL SPEED SENSOR
TM: SPEED CHANGE MECHANISM
W: WHEEL

The invention claimed is:

1. A control device that controls a vehicle drive device in which a first engagement device, a rotary electric machine, and a second engagement device are arranged in this order from an internal combustion engine on a power transmission path that connects the internal combustion engine to wheels, wherein,
when the control device determines an operation stop of the internal combustion engine in a state in which torque is transmitted from the internal combustion engine to the wheels, the control device executes rotational speed control that controls output torque of the rotary electric machine such that a rotational speed of the rotary electric machine approaches a target rotational speed and executes torque-down control that causes output torque of the internal combustion engine to decrease.

2. The control device according to claim 1, wherein, when the control device determines an operation stop of the internal combustion engine, the control device controls the second engagement device so as to be in a slip engaged state.

3. The control device according to claim 2, wherein, in the torque-down control, the control device causes the output torque of the internal combustion engine to gradually decrease and causes an engagement pressure of the first engagement device to decrease in accordance with a decrease in the output torque of the internal combustion engine due to the torque-down control.

4. The control device according to claim 3, wherein, during the execution of the torque-down control, the control device controls the engagement pressure of the first engagement device such that a rotational speed of the internal combustion engine approaches a target rotational speed.

5. The control device according to claim 3, wherein, after the control device determines that the first engagement device has been brought into a disengaged state due to a decrease in the engagement pressure of the first engagement device, the control device causes the second engagement device to transition from the slip engaged state to a direct engaged state.

6. The control device according to claim 5, wherein
the control device estimates drag torque that is transmission torque transmitted through the first engagement device in a state in which a request value of the engagement pressure of the first engagement device is zero, and
after the engagement pressure of the first engagement device starts to decrease, when the output torque of the rotary electric machine achieves a determination torque, the control device determines that the first engagement device has been brought into the disengaged state, the determination torque being set in accordance with torque acquired by subtracting the drag torque from transmission torque that is transmitted from the rotary electric machine to the wheels side through the second engagement device that is controlled so as to be in the slip engaged state.

7. The control device according to claim 6, wherein the control device estimates the drag torque based on a rotational speed difference between engagement members of the first engagement device.

8. The control device according to claim 3, wherein,
after the control device determines that the first engagement device has been brought into a disengaged state due to a decrease in the engagement pressure of the first engagement device, the control device stops combustion of the internal combustion engine.

9. The control device according to claim 8, wherein the control device estimates drag torque that is transmission torque transmitted through the first engagement device in a state in which a request value of the engagement pressure of the first engagement device is zero, and
after the engagement pressure of the first engagement device starts to decrease, when the output torque of the rotary electric machine achieves a determination torque, the control device determines that the first engagement device has been brought into the disengaged state, the determination torque being set in accordance with torque acquired by subtracting the drag torque from transmission torque that is transmitted from the rotary electric machine to the wheels side through the second engagement device that is controlled so as to be in the slip engaged state.

10. The control device according to claim 9, wherein
the control device estimates the drag torque based on a rotational speed difference between engagement members of the first engagement device.

11. The control device according to claim 3, wherein,
after the control device determines that the first engagement device has been brought into a disengaged state, the control device stops combustion of the internal combustion engine, and thereafter, causes the second engagement device to transition from the slip engaged state to a direct engaged state.

12. The control device according to claim 11, wherein,
the control device stops the combustion of the internal combustion engine, the rotational speed of the internal combustion engine achieves a determination rotational speed, and thereafter, the control device causes the second engagement device to transition from the slip engaged state to the direct engaged state, the determination rotational speed being set in accordance with a synchronous rotational speed that is a rotational speed of the rotary electric machine when the second engagement device is in the direct engaged state.

13. The control device according to claim 12, wherein,
after the second engagement device is brought into the direct engaged state, the control device terminates the rotational speed control for the rotary electric machine and starts torque control for the rotary electric machine.

* * * * *